United States Patent [19]
Kanota et al.

[11] Patent Number: 5,909,531
[45] Date of Patent: *Jun. 1, 1999

[54] TELEVISION SIGNAL RECORDING/ REPRODUCING APPARATUS AND METHOD WITH DC SHIFTER

[75] Inventors: Keiji Kanota, Kanagawa; Naofumi Yanagihara, Tokyo, both of Japan

[73] Assignee: Sony Corporation, Tokyo, Japan

[ * ] Notice: This patent is subject to a terminal disclaimer.

[21] Appl. No.: 08/881,813

[22] Filed: Jun. 24, 1997

Related U.S. Application Data

[62] Division of application No. 08/657,980, May 30, 1996, Pat. No. 5,724,470.

[30] Foreign Application Priority Data

Jun. 5, 1995 [JP] Japan .................................. 7-161423

[51] Int. Cl.$^6$ .................................................. H04N 9/79
[52] U.S. Cl. .................................. 386/9; 386/33; 386/40; 386/131
[58] Field of Search ..................................... 348/691, 692, 348/693, 694; 386/1, 9, 10, 26, 27, 33, 35, 37, 40, 111, 112, 123, 124, 131, 93, 113, 114, 76, 47

[56] References Cited

U.S. PATENT DOCUMENTS 5,293,248   3/1994   Bergen et al. ............................ 386/37

OTHER PUBLICATIONS

Tojo et al., "Recording Method of the PALplus Signal", IEE Colloquium, Digest No: 1994/090, pp. 6/1–6/4, Apr. 12, 1994.

*Primary Examiner*—Thai Tran
*Assistant Examiner*—Aung S. Moe
*Attorney, Agent, or Firm*—Frommer Lawrence & Haug, LLP.; William S. Frommer

[57] ABSTRACT

Recording and reproducing a television signal with a DC shifter prevents compression distortion of a PAL plus television signal. The PAL plus television signal includes a vertical resolution signal for enhancing vertical resolution which vertical resolution signal is included in the same compression blocks as some of the component video signals. Such compression blocks are shifted to a DC set up value so that the signals within those compression blocks do not have varying DC offsets which otherwise could result in compression distortion. Similarly, upon reproduction, the DC set up value is removed after decompression and the original television signal is restored with complete vertical resolution.

16 Claims, 21 Drawing Sheets

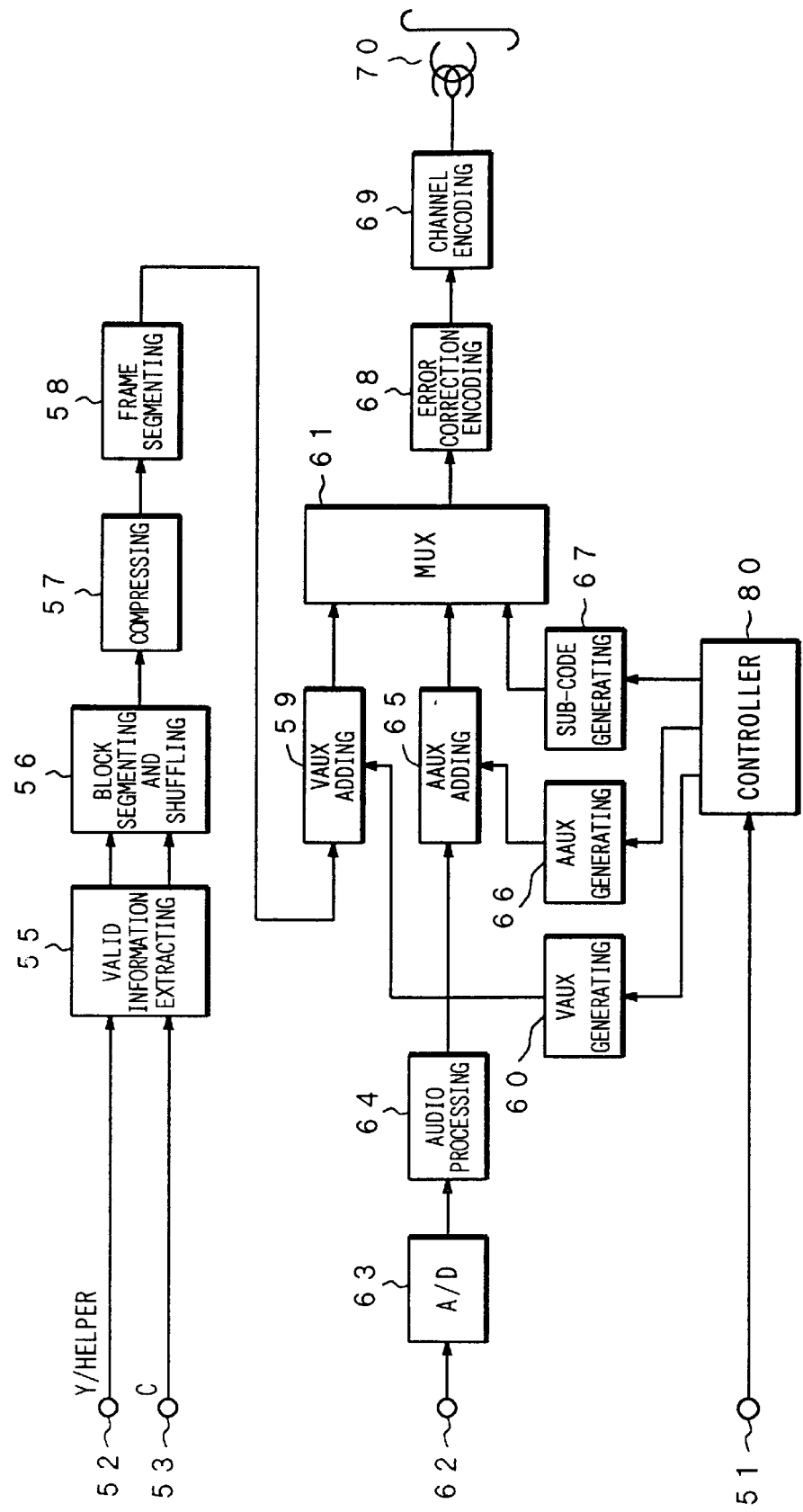

AT APT=000

AT AP1=AP2=AP3=000

| WORD NAME | MSB | LSB |
|---|---|---|
| PC0 | HEADER | |
| PC1 | | |
| PC2 | DATA | |
| PC3 | | |
| PC4 | | |

| PC0 | 0 1 1 0 0 1 1 0 |
|---|---|
| PC1 | ----------→ LSB | DATA TYPE |
| PC2 | ---------- DATA ---------- |
| PC3 | ---------- (UP TO 28 BITS) ---------- |
| PC4 | ←--------- MSB |

DATA TYPE:
    0000 = VBID
    0001 = WSS
    0010 = EDTV-2 ID ON LINE 22
    0011 = EDTV-2 ID ON LINE 285
    0100 = NO INFORMATION
  OTHERS = NOT DEFINED

PRE-SYNC BLOCK

POST-SYNC BLOCK

TRACK NUMBER →

| | 1 | 2 | 3 | 4 | 5 | 6 | 7 | 8 | 9 | 10 |
|---|---|---|---|---|---|---|---|---|---|---|
| 8 | 55 | f | 55 | | 55 | | 55 | | 55 | |
| 7 | 54 | e | 54 | | 54 | | 54 | | 54 | |
| 6 | 53 | d | 53 | | 53 | | 53 | | 53 | |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | c | 52 | | 52 | | 52 | | 52 | | 52 |
| 1 | b | 51 | h | 51 | | 51 | | 51 | | 51 |
| 0 | a | 50 | g | 50 | | 50 | | 50 | | 50 |

↑ PACK NUMBER

PAL PLUS RECEIVER

CONVENTIONAL RECEIVER fsc = 4.43 MHz fsc = 4.43 MHz

PALplus SIGNAL

_5,909,531_

TELEVISION SIGNAL RECORDING/REPRODUCING APPARATUS AND METHOD WITH DC SHIFTER

This application is a division of application Ser. No. 08/657,980, filed May 30, 1996, U.S. Pat. No. 5,724,470.

BACKGROUND OF THE INVENTION

The present invention relates to digitally recording and reproducing a television signal and, more particularly, to digitally recording and reproducing a PAL plus television signal.

Television signals are broadcast using various transmission standards. PAL is one such standard primarily employed in European countries. PAL plus is the next generation broadcasting standard of PAL that provides higher image quality than its predecessor. Another distinctive feature of the PAL plus standard is that the television picture has an aspect ratio of 9:16, which is considered more aesthetically pleasing than the aspect ratio of 3:4 which is the aspect ratio primarily used heretofore by television receivers. As shown in FIG. 27A, the PAL plus image of FIG. 27B is superimposed on the 3:4 aspect ratio of the conventional television receiver, image demonstrating the differences in aesthetic appearance between the two standards. The PAL plus standard is compatible with PAL television receivers and thus, the PAL plus television signal is derived from the PAL television signal. To obtain the 9:16 aspect ratio, a vertical conversion circuit decimates the PAL plus television signal using a 3 to 4 decimation process.

However, the decimation process deteriorates the vertical resolution of the PAL plus image. To correct this vertical deterioration the PAL plus standard transmits a vertical resolution signal (hereinafter referred to as a helper signal) during the upper and lower invalid screen portions (FIG. 28) of the PAL plus television signal. The helper signal is employed by the PAL plus television receiver to reconstruct the lost vertical resolution.

A problem arises, however, when the PAL plus signal is recorded digitally as, for example, occurs in a discrete cosine transform DCT process. In the DCT process, each television frame is divided into blocks of pixels (8×8, for example), and each block is DCT transformed. As shown in FIG. 31, the 8×8 DCT blocks extend into the upper invalid screen portion where the helper signal is stored. Consequently, portions of the helper signal are processed with the main screen portion in the same DCT block. Because the signal values between the DCT blocks and the helper signal are significantly different, the DCT process calculates erroneous DCT coefficients and a resultant image distortion occurs. In this case, the invalid screen portions include pixel information from the middle of the television picture, and the resultant distortion affects the center of the picture as shown in FIG. 32.

OBJECTS AND SUMMARY OF THE INVENTION

An object of the invention, therefore is to provide a television signal recording/reproducing apparatus and method for preventing DCT distortion.

A further object of the invention is to provide a television signal recording/reproducing technique which DC shifts the signals within a respective compression block containing both a vertical resolution signal and a component video signal to a DC set up value.

A further object of the invention is to provide a television signal recording/reproducing technique for DC shifting a vertical resolution signal to a DC set up value.

A further object of the invention is to provide a television signal recording/reproducing technique which DC shifts a component signal to the DC set up value.

Yet another object of the invention is to provide a television signal recording/reproducing technique for digitally recording and reproducing a PAL plus signal without a loss in vertical resolution.

In accordance with the above objectives, the present invention provides a television signal recording/reproducing apparatus and method with DC shifter. The DC shifter shifts a signal within a compression block to a DC set up value such that compression distortion arising from the compression of signals of varying DC offsets within the compression block during digital recording is prevented.

Upon reproducing the digitally recorded television signal, the present invention removes the DC set up value from the compression block in order to retrieve the recorded television signal.

Since the vertical resolution signal and the component video signal are normalized to a DC set up value, DCT distortion does not arise when the signals are compressed during recording. Thus, the compression blocks at the border between the upper invalid portion and the main screen portion of the television signal do not cause a DCT compression problem and the vertical resolution of the resulting image is completely restored.

BRIEF DESCRIPTION OF THE DRAWINGS

FIG. 5 is a block diagram of a recording side of a digital VCR;

DETAILED DESCRIPTION OF THE PREFERRED EMBODIMENTS

Figure 1:
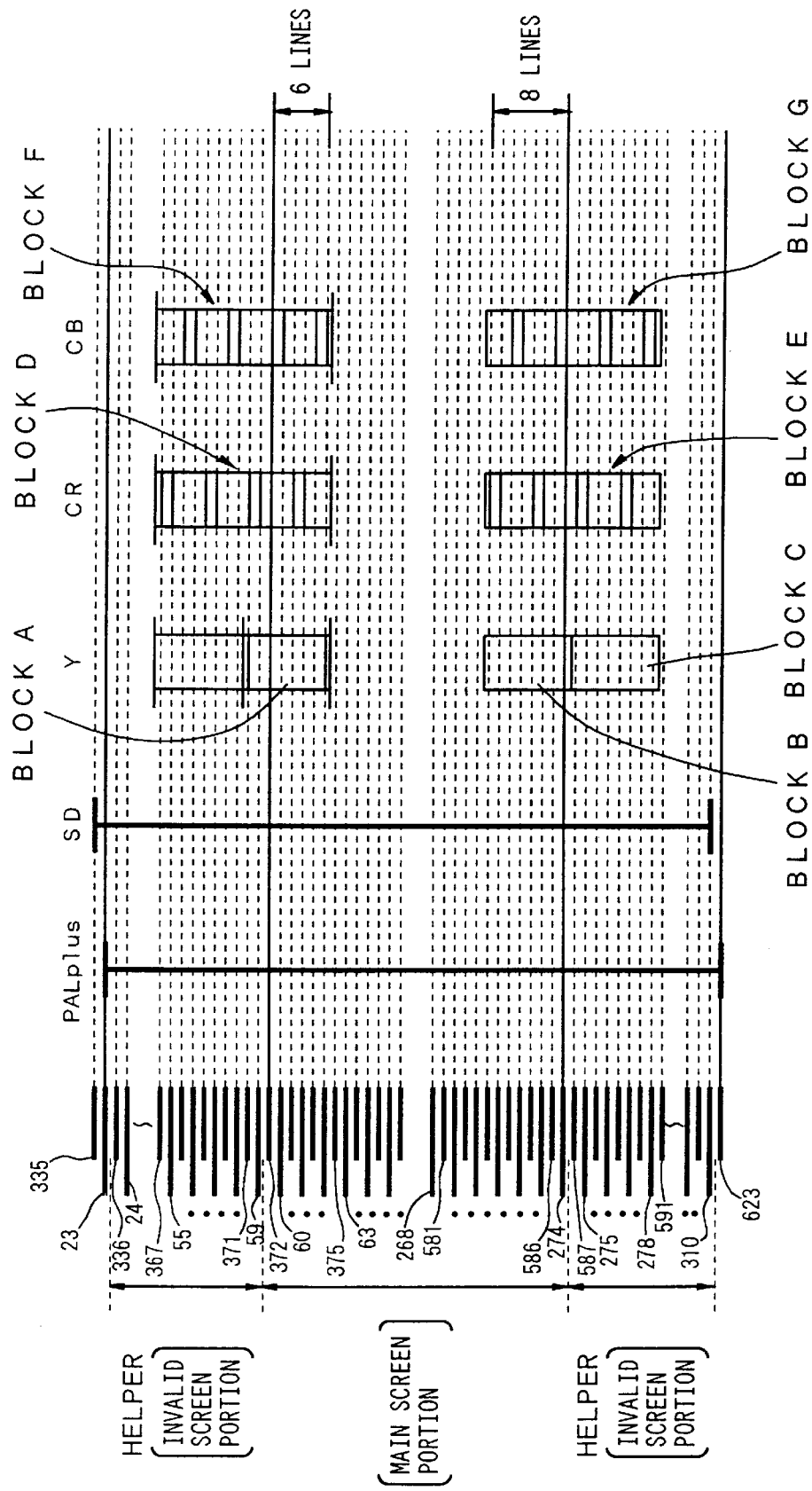
FIG. 1 is a schematic diagram showing the relation between lines and DCT blocks.

Referring now to the drawings, wherein like reference numerals designate identical or corresponding parts throughout, the present invention will be described.

PAL Plus Standard

The PAL plus standard now will be explained in more detail with particular attention to the above-described distortion problem.

Figure 28:
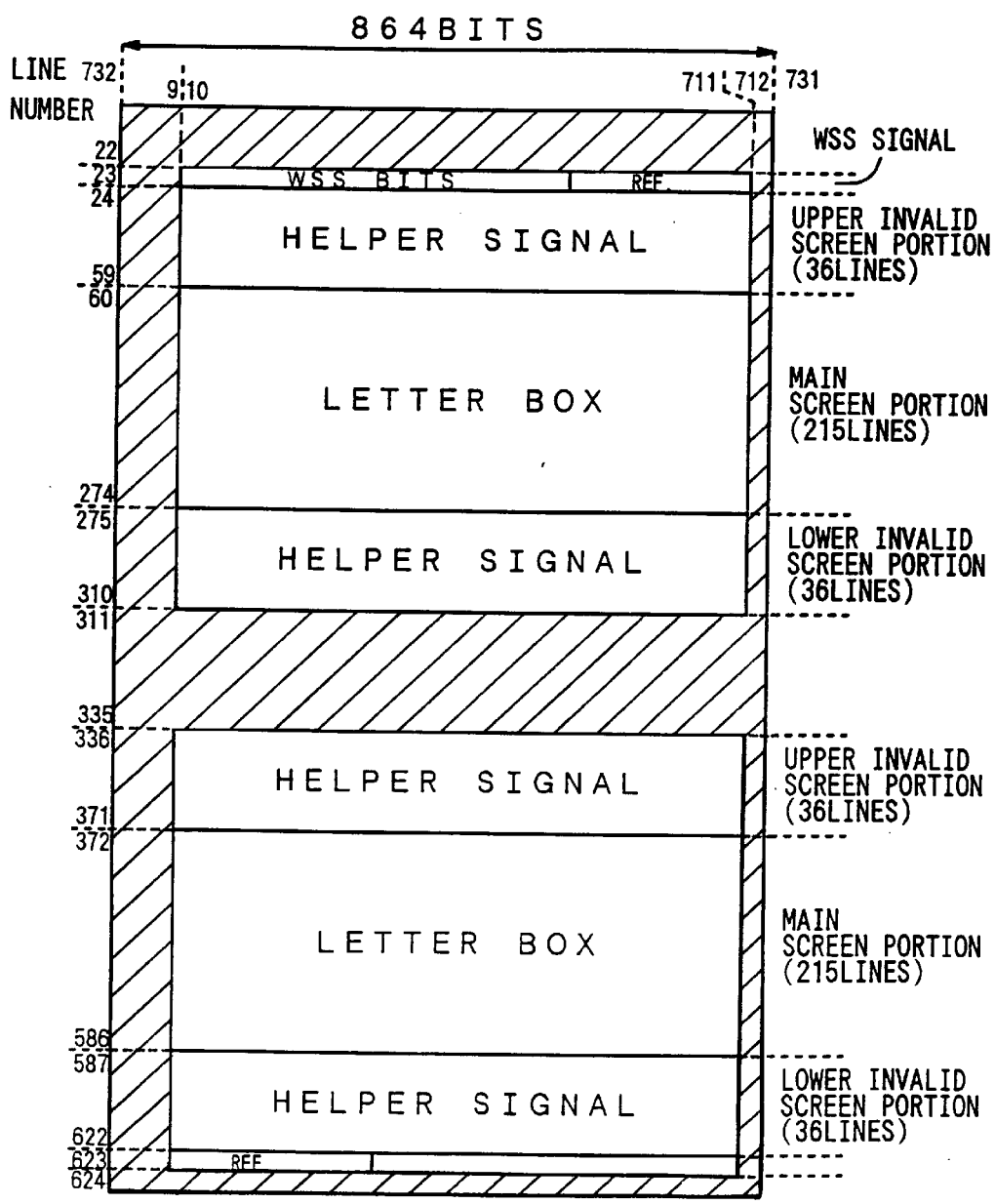
FIG. 28 is a schematic diagram showing a line assignment and a pixel assignment of a PAL plus signal.

The format for transmitting a PAL plus signal corresponding to a frame of a television image is shown in FIG. 28. The PAL plus transmission is composed of 625 lines of a PAL plus signal sampled at 13.5 MHz. The samples begin on line 23 at sample number 10. The sampled PAL plus signal is transmitted in a 4:2:2 ($Y:C_B:C_R$) format, meaning that the blue color difference signal ($C_B$) and the red color difference signal ($C_R$) are sampled twice for every four samplings of the luminance (Y) signal. The 4:2:2 format is generated by separating the PAL plus signal into two fields, field 1 and field 2 (depicted in FIG. 28 as the two separate areas designated "Letter Box"), and alternatively transmitting the color difference signals in each field. Since the blue color difference signal ($C_B$) is B−Y and the red color difference signal ($C_R$) is R−Y, the luminance signal (Y) can be extracted from each color difference signal in the fields. Since both fields are composed of luminance signals (Y) on each line, while each field is composed of alternating color difference signals ($C_B$, $C_R$) the 4:2:2 ($Y:C_B:C_R$) format is satisfied.

Figure 30A:
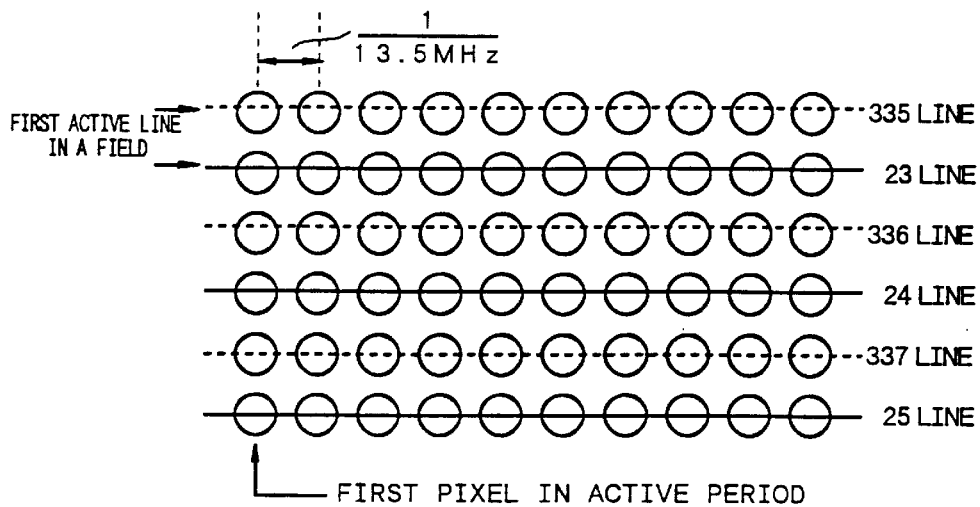
FIGS. 30A and 30B are schematic diagrams of a sampling standard for digital VCR recording according to 625 lines/50 Hz system.
Figure 30B:
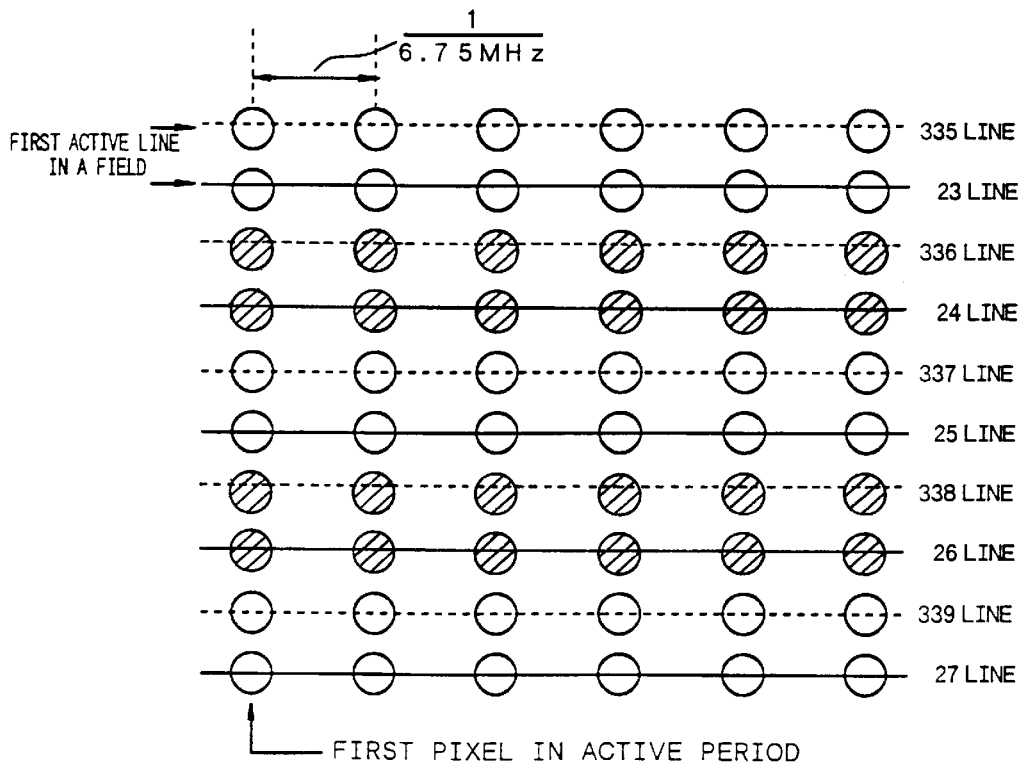
Figure 31:
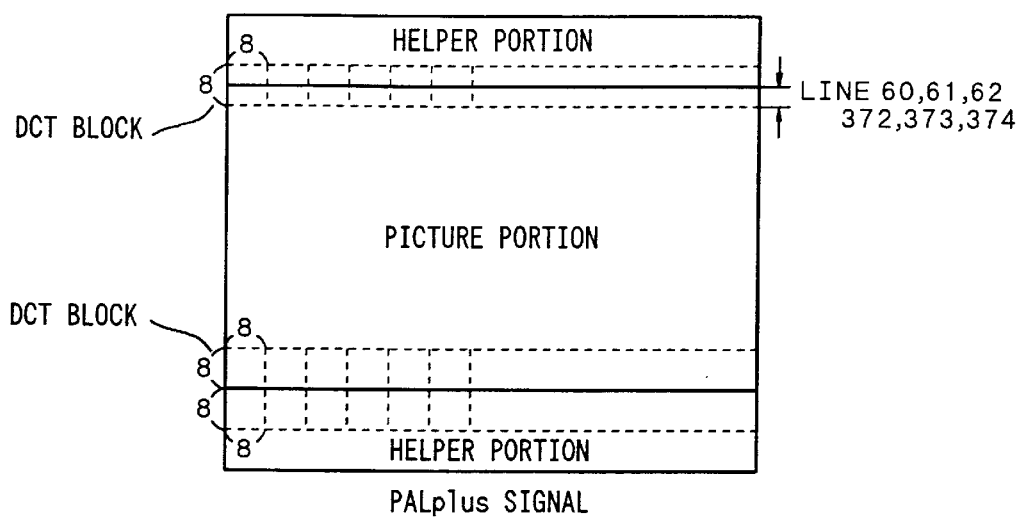
FIG. 31 is a schematic diagram showing a row of DCT blocks which include both the helper portion and the picture portion.

FIGS. 30A and 30B depict how the PAL plus standard reintegrates the samples from each-of the fields, field 1 and field 2, from the 4:2:2 transmission format. FIG. 30A shows that the luminance signals (Y) are extracted from each line in each field and reassembled by alternatively selecting the lines from each field since each line in the main portions of both fields 1 and 2 contains a luminance signal (Y). Thus, the luminance signal (Y) is retrieved from lines 335, 23, 336, 24, 337, 25 and so on, in sequential order. On the other hand, the color difference signals $C_B$ and $C_R$ are located on alternate lines in each of fields 1 and 2. For example, line 23 in field 1 includes color difference signals ($C_R$) and subsequent line 24 in field 1 includes color difference signals ($C_B$). Thus, alternating the fields from which the lines are selected results in the pattern shown by FIG. 30B wherein every two lines contain the same type of color difference signal. It will be seen that the sampling rate of the color difference signals is one-half the sampling rate of the luminance signal.

The contents of each field will now be described in more detail with reference to FIG. 28. The useful portion of field 1 begins on line 23 at sample number 10 with a wide screen signal (WSS) which indicates the presence of the helper signal. The WSS signal is followed on line 23 by a helper reference burst signal which is used to decode the helper signal at the receiving television apparatus. The helper signal for field 1 is transmitted during the upper and lower invalid screen portions of field 1 on lines 24 to 59 and 275 to 310, respectively. Next, the picture data of the PAL plus signal, which has been decimated and DCT processed, is transmitted during the main screen portion on lines 60 to 274 of field 1. Similarly, field 2 transmits the helper signal during the upper and lower invalid screen portions on lines 336 to 371 and 587 to 622, respectively. The decimated and DCT processed image is transmitted during the main screen portion of field 2 on lines 372 to 586. The last useful line of field 2, line 623, contains white and black level reference signals which are used to define the range of values of the sampled image.

Figure 29A:
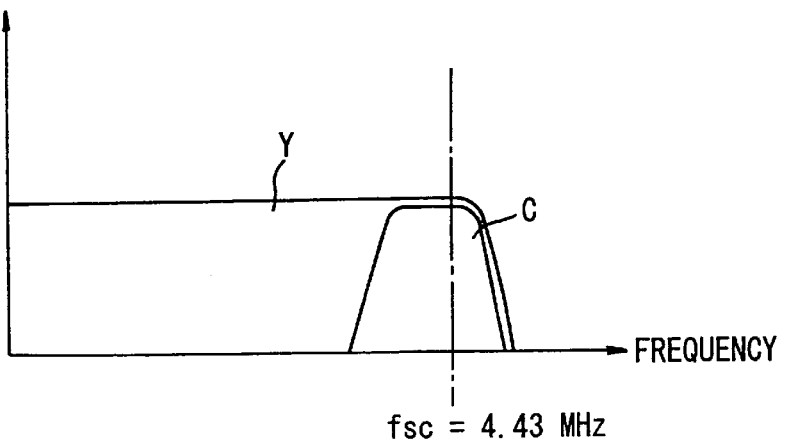
FIGS. 29A and 29B are graphs of the component signals comprising the PAL plus signal in the frequency domain.
Figure 29B:
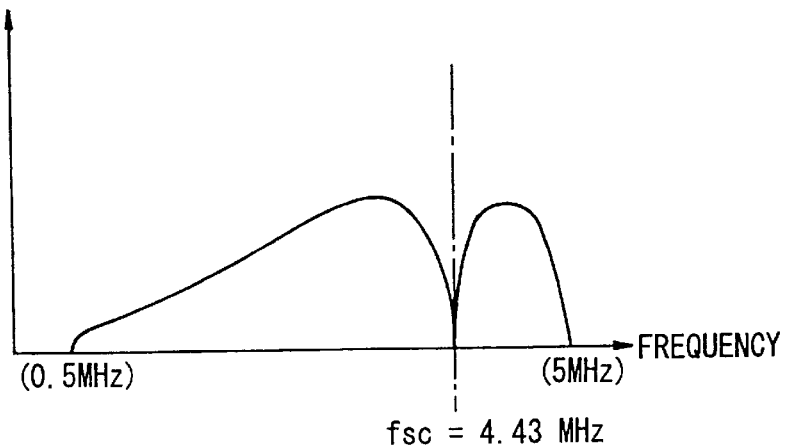

The luminance signal (Y), the color-difference signals (C) and the helper signal occupy the frequency spectrum graphically depicted in FIGS. 29A and 29B. It will be noticed from FIG. 29A that the luminance signal (Y) has a center frequency of approximately 2.5 MHz with a bandwidth of 5.0 MHz; while the color difference signals (C) have a center frequency of approximately 4.43 MHz with a bandwidth of approximately 1 MHz. As shown in FIG. 29B, the helper signal has a center frequency of approximately 4.43 MHz with a bandwidth of approximately 5 MHz. Since the color difference signals (C) and the helper signal have the same center frequency, it is tempting to process the helper signal as a color difference signal (C). However, the helper signal has a much larger bandwidth (approximately 5 MHz) than the color difference signals (C) (approximately 1 MHz) and processing the helper signal as a color difference signal results in truncation of the helper signal.

Thus, a problem arises when the helper signal is truncated during color difference signal processing in that the vertical resolution is not restored to its full image quality. The present invention resolves this problem by processing the helper signal with the luminance signal (Y) which, as shown in FIG. 29A, has a sufficiently wide bandwidth to accommodate the helper signal. However, the luminance signal (Y) extends into the upper invalid screen portion in which the helper signal resides. As described, the significant difference in value between the helper signal and the luminance signal (Y) in the area of overlap causes DCT compression distortion.

The reason why the DCT blocks of the luminance signal (Y) extend into the upper invalid screen portion will be explained with reference to FIG. 1. FIG. 1 depicts fields 1 and 2 integrated into a single PAL plus image with alternating lines of each field. The PAL plus image is segmented into an upper invalid screen portion, a main screen portion and a lower invalid screen portion. DCT blocks A–G represent the groups of pixels which are DCT transformed and are depicted as rectangular blocks superimposed on the PAL plus image. It will be noticed that the luminance blocks are eight samples wide by eight lines long and are twice as large as the color difference blocks, as dictated by the 4:2:2 ($Y:C_B:C_R$) format. The blocks start at line 335 and are repeated every eight lines for the entire PAL plus image. Thus, the first row of luminance blocks (Y) of the main screen portion begins with block A on line 371.

However line 371, as shown in FIG. 1, is in the upper invalid screen portion. Thus, the first row of blocks processed as a luminance signal (Y) overlaps into the upper invalid screen portion and the above-described DCT distortion problem occurs. It will be noted, on the other hand, that block B, which begins the last row of luminance blocks of the main screen portion, does not extend into the lower invalid screen portion and does not present a DCT distortion problem. It will also be appreciated that the color difference blocks D, E, F and G are not effected by the helper signal because the helper signal is processed as a luminance block not as a color difference block. Thus, the color difference blocks may extend into the upper and lower invalid screen portions without any problem. Thus, in the preferred embodiment, the problem of DCT distortion occurs with the luminance blocks in the area of the upper invalid screen portion.

Recording Apparatus

To resolve the problem of DCT distortion, the present invention DC shifts the helper signal. The DC shifting is performed by the recording apparatus of the PAL plus reorder depicted in FIG. 2 by processing circuit 6 shown in FIG. 4, as will be explained in more detail below.

Figure 2:
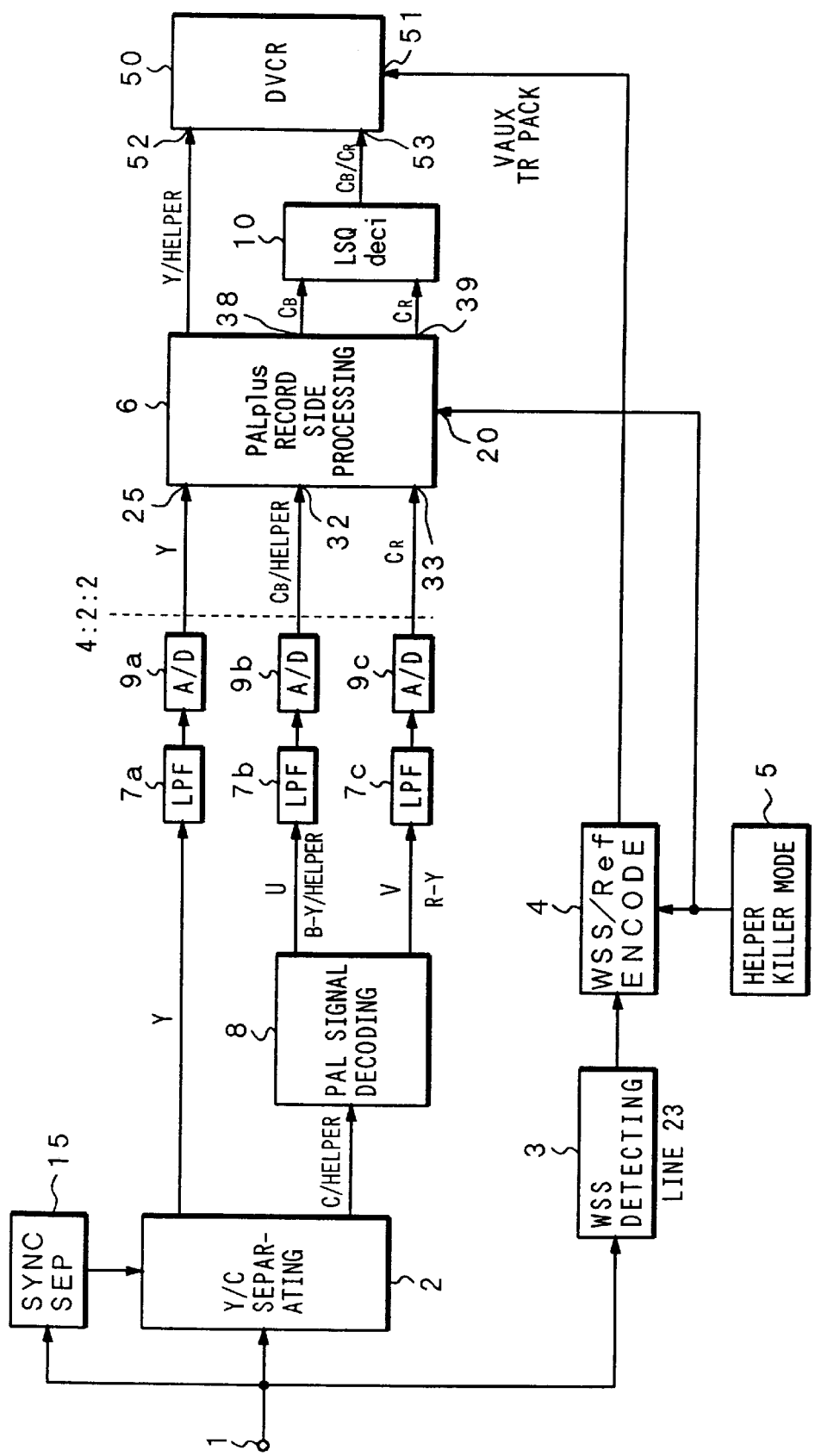
FIG. 2 is a block diagram showing a recording apparatus for a PAL plus signal according to the present invention.

The recording apparatus of FIG. 2 has an input terminal 1 for receiving and forwarding the PAL plus signal to a Y/C separating circuit 2. The Y/C separating circuit 2 separates the luminance signal (Y) from the chrominance signal (C) so that these signals can be processed separately. The separation process is timed by a sync-separating circuit 15 which determines the position of a current sample based on horizontal and vertical sync pulses supplied with the PAL plus signal The separated luminance signal (Y) is forwarded to a low pass filter (LPF) 7a that filters out high-frequency noise. The resulting filtered luminance signal (Y) is forwarded to an analog-to-digital converter 9a for digitization into, for example, four bits of data, corresponding to the 4:2:2 data format.

The chrominance signal C, separated from the luminance signal (Y), is forwarded to the PAL signal decoding circuit 8 for further separation into color difference signals (B−Y) and (R−Y). It will be noted that the helper signal accompanies the chrominance signal (C) during transmission of the PAL plus signal and is, therefore, initially processed as a chrominance signal. The separated color difference signals are forwarded to low pass filters 7b and 7c for filtering out high-frequency noise and, then, to analog-to-digital converters 9b and 9c for digitization into two bits of color difference data for each color difference signal. It will be appreciated that the four bits of the luminance signal (Y), the two bits of the blue color difference signal ($C_B$) and the two bits of the red color difference signal ($C_R$) form the 4:2:2 data format of the PAL plus standard.

Figure 3:
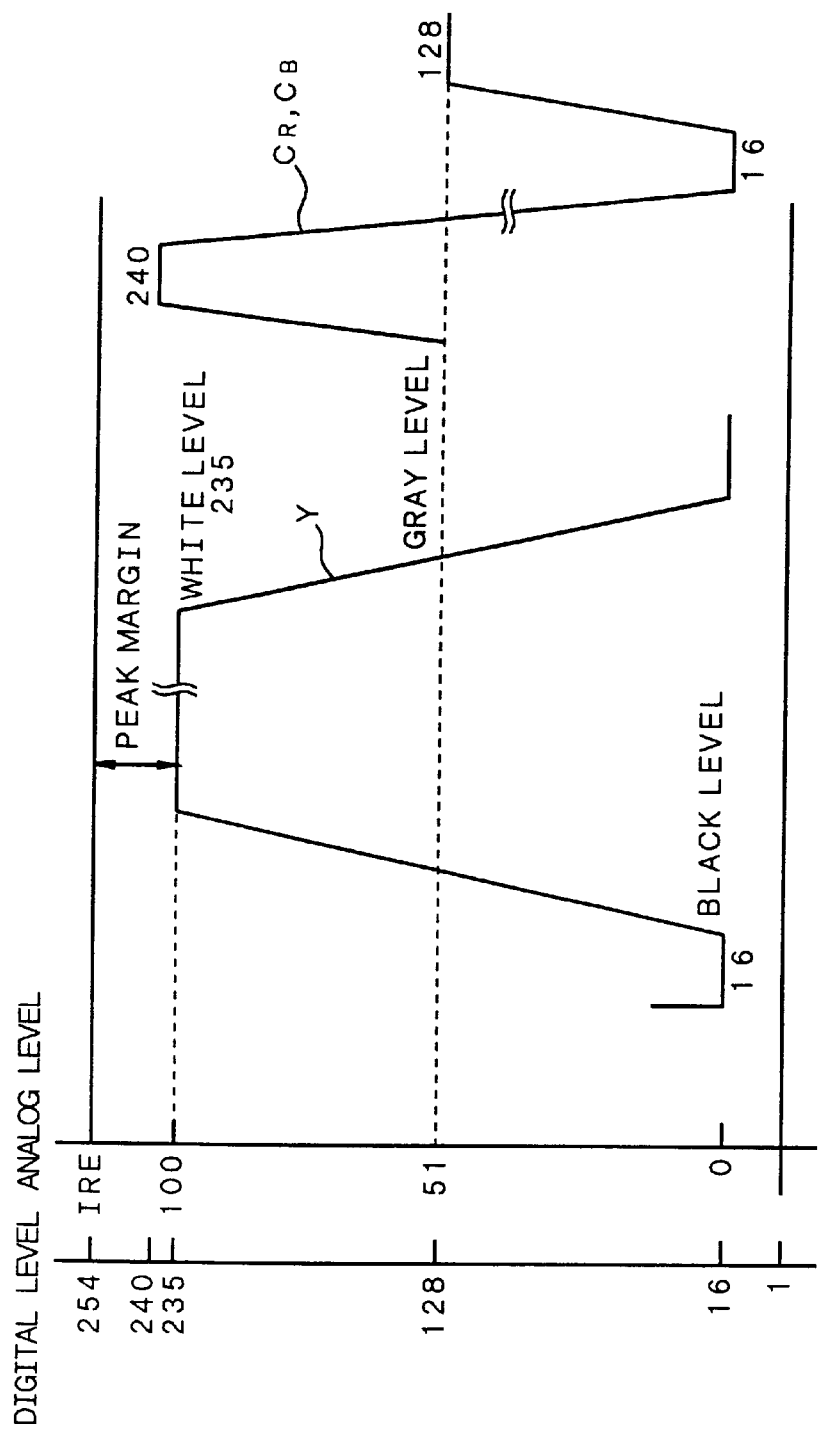
FIG. 3 is a schematic diagram showing a digital normalization process of the PAL plus signal.

The analog-to-digital converters (9a–9c) also normalize the component signals (Y, $C_B$, $C_R$) as shown in FIG. 3. Normalization adjusts the digital value of each pixel so that all pixels are measured on the same scale. This ensures that the correct color for each pixel is displayed. As shown in FIG. 3, the scale employed for the luminance signal (Y) in the PAL plus standard ranges from a black level "16" to a white level "235" (a mid-level "128" is considered "gray"). The color difference signals ($C_B$, $C_R$) are adjusted to a scale with a range between "16" and "240". It will be noted that the color difference signals do not effect luminosity and, therefore, can exceed the white level "235". It will also be noted that the black level "16" is considered a pedestal level because it is above "0".

During recording, signals in the invalid screen portions are ignored by the digital VCR 50 and must be specially recorded. The helper signal is an important signal in the invalid screen portions since it corrects vertical resolution and, therefore, must be specially recorded. The WSS signal on line 23 of the PAL plus signal (FIG. 28) indicates that a helper signal is forthcoming and must be specially recorded. The corresponding reference burst signal contains information necessary to decode the helper signal after the helper signal is extracted from the PAL plus signal and it too must be specially recorded. Thus, the helper signal, WSS signal and reference signal are to be specially recorded. As described, the helper signal is recorded with the luminance signal. To that end, a WSS detecting circuit 3 and a WSS/reference encoder 4 are provided which rewrite the WSS and reference burst signals to the digital VCR 50 for storage on a record medium.

It may be desirable to "kill" the helper signal when, for example, the digital VCR is not equipped to process PAL plus signals. In another instance, the helper signal bandwidth is too wide for the digital VCR and is truncated during recording. In these situations, the presence of the helper signal would be a detriment because the vertical resolution would not be restored. Thus, a helper killer mode circuit 5 instructs both the WSS/reference encoder 4 and the processing circuit 6 to replace the signals in the invalid screen portions (including the WSS signal, the reference burst signal and the helper signal) with steady-state values.

The separated signals (Y, $C_B$, $C_R$) are forwarded to the processing circuit 6 for special processing. It will be noted that the helper signal is transmitted to the processing circuit on the blue color difference signal $C_B$ line 32.

Figure 4:
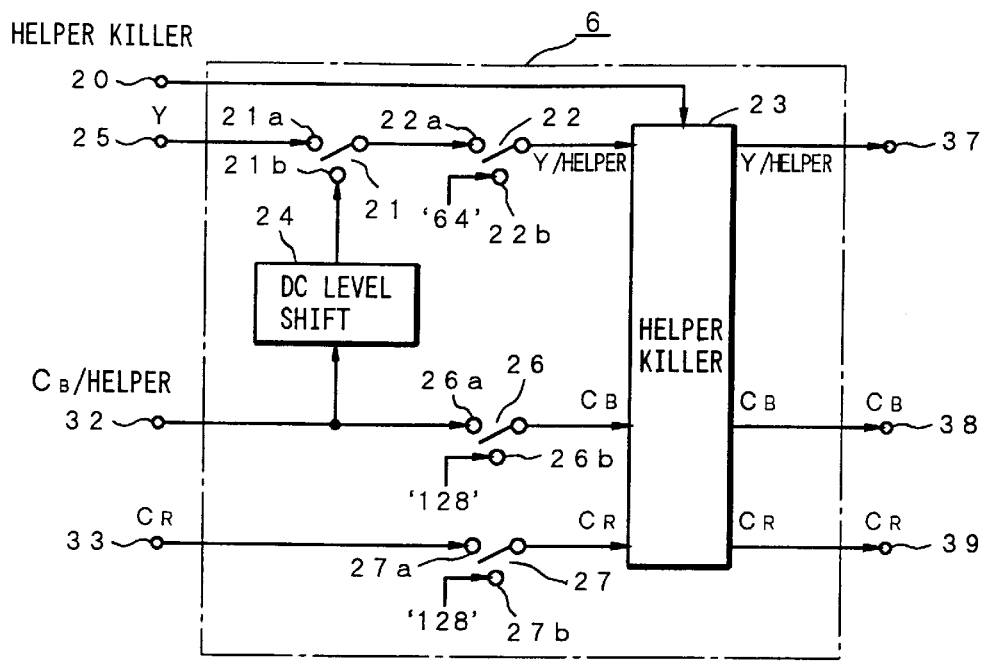
FIG. 4 is a block diagram showing the PAL plus record side processing circuit of FIG. 2.

Turning now to FIG. 4, the processing circuit 6 is shown in more detail. The luminance signal Y is received by input terminal 25 and sent to switch 21, which selects the luminance signal (Y) from terminal 21a when the main screen portions of the PAL plus signal are received. On the other hand, the switch 21 selects the helper signal from terminal 21b during transmission of the invalid screen portions of the PAL plus signal. The selected signal is, then, sent to switch 22 for further processing as will be discussed in more detail below.

The blue color difference signal ($C_B$) and the helper signal are received by input terminal 32 and forwarded to both the DC level shift circuit 24 and the switch 26. The DC level shift circuit adds a pre-determined DC offset (DC set up value) to the received signal to match the DC offset of the luminance signal (Y). During the invalid screen portions of the PAL plus signal, the helper signal is input to the DC level shift circuit and the switch 21 selects the DC level shifted helper signal from terminal 21b. In the preferred embodiment, the normalized value of the luminance signal (Y) is "64", and the signals in the invalid screen portions are DC level shifted by this value. Thus, the helper signal is extracted from the blue color difference signal ($C_B$) line and normalized for the luminance signal line (Y). As a result, the helper signal in the area between the upper invalid screen portion and the main screen portion is normalized and DCT distortion does not occur.

During transmission of the main screen portions, the blue color difference signal ($C_B$) effectively bypasses the DC level shift circuit (because switch 21 in not coupled to the DC level shift circuit) and is output to switch 26. Similarly, the red color difference signal ($C_R$) received by input terminal 33 is forwarded to switch 27.

Figure 32:
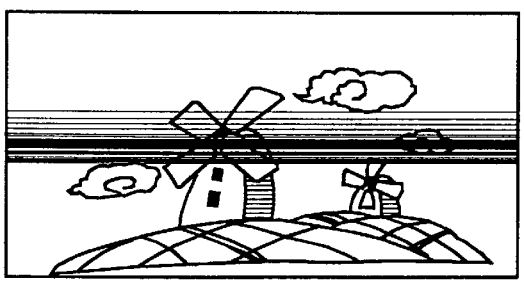
FIG. 32 shows the distortion effect caused by compressing the DCT blocks of FIG. 31.

Switches 22, 26 and 27 are each controlled by a line counter (not shown) which keeps track of the PAL plus line number then being received. The purpose of these switches is to normalize certain lines in the main screen portion which give rise to the DCT distortion. These lines are the six lines (60 to 62 and 372 to 374) in the first row of DCT blocks (i.e., block A). Thus, switch 22 switches to the normalized value "64" supplied to terminal 22b during transmission of lines 60 to 62 and lines 372 to 374, Similarly, switches 26 and 27 switch to the gray level "128" during transmission of line 60 to 62 and lines 372 to 374. By controlling the switches 22, 26 and 27 in this manner, the levels of the luminance signal (Y) and helper signal within the first row of DCT blocks are normalized to the same DC set up value. Thus, the difference of levels between the main screen portion and the upper invalid screen portion is suppressed and DCT compression distortion (FIG. 32) is prevented.

The signal selected by the switches 22, 26 and 27 are forwarded to the helper killer circuit 23 which is controlled by the helper killer signal received by input terminal 20. As described, some digital VCR's are unequipped to handle a helper signal or may have a frequency band that is lower than the helper, resulting in a decrease of vertical resolution. Thus, the helper killer circuit "kills", or cancels, the signals transmitted during the invalid screen portions. Specifically, the helper killer circuit 23 replaces the signals in the invalid screen portions with normalized values. In the preferred embodiment, the normalized values are those same values used by switches 22, 26 and 27 such that all signals output from the PAL plus record side processing circuit (FIG. 2) are normalized about the same values. Therefore, the helper killer circuit substitutes the digital value "16" for the luminance signal (Y), digital value "128" for the color difference signals ($C_B$ and $C_R$), and digital value "64" for the WSS signal present on line 23.

The luminance signal (Y), the helper signal and the color difference signals ($C_B$ and $C_R$) thus processed by the PAL plus record side processing circuit are output from terminals 37, 38 and 39 as shown in FIG. 4. It will be noted that the luminance signal (Y) line (terminal 37) now carries both the luminance signal (Y) as well as the DC level shifted helper signal and forwards both signals directly to input 52 of the digital VCR 50 (FIG. 2). On the other hand, the color difference signals ($C_B$ and $C_R$) undergo line sequencing before being sent to the digital VCR. This is because the digital VCR records the color difference signals as a combination signal simply identified as the chrominance signal (C) on the record medium. Thus, a line sequencing circuit 10 alternately combines the color difference signals onto a single output line and forwards these signals to the input 53 of the digital VCR.

Digital VCR

The digital VCR 50 of FIG. 2 receives the luminance signal (Y), the helper signal and the color difference signals $C_B$, $C_R$ and records these signals to a record medium. The digital VCR 50 (FIG. 2) will now be described in more detail with reference to FIG. 5. The digital VCR receives the luminance signal (Y) and the helper signal at input 52, the chrominance signal (C) at input 53, audio data at input 62 and the WSS and reference signal at input 51. As will be described in more detail, these signals are processed by the digital VCR and written onto a record medium via a recording head 70.

The luminance signal (Y) and the chrominance signal (C) input at terminals 52 and 53, respectively, are forwarded to a valid information extracting circuit 55. The valid information extracting circuit is operable to remove extraneous information in the invalid screen portions (including the horizontal and vertical blanking intervals). The information transmitted during the valid screen portion (lines 23 to 310 of field 1 and lines 335 to 622 of field 2), on the other hand, are forwarded to a block segmenting and shuffling circuit 56.

The block segmenting and shuffling circuit receives the valid portions of the PAL plus signal and segments the valid portions into DCT blocks (for example, 8×8) in preparation for DCT compression. The blocks are shuffled such that a mean deviation between subsequent blocks remains substantially the same during DCT compression. It will be appreciated that the shuffling prevents data from being lost due to head failure or tape damage since the blocks are more randomly disbursed on the record medium.

The shuffled blocks are now ready for DCT compression and are sent to the compressing circuit 57. It will be noted that the luminance blocks (e.g., block A, FIG. 1), which extend into the upper invalid portion, have been DCT shifted by the PAL plus record side processing circuit 6 (FIG. 2). Thus, the compressing circuit does not compress blocks with significantly different values, such as when the luminance blocks are not DC shifted. Thus, the resulting compressed blocks do not produce a deviation in the DCT coefficients and a resulting image distortion is prevented.

While the preferred embodiment expresses a preference for a DCT circuit, other types of compression, of course, can be applied. DCT compression in the preferred embodiment compresses data by using a discrete cosine transform and a variable length encoding algorithm. Such a compressing circuit includes: a DCT circuit; a quantizing circuit which quantizes the DCT transform data coefficients; an estimator that estimates the total code amount and determines an optimum quantizer; and a variable length encoding circuit that compresses data corresponding to a two-dimensional code (such as a Huffman code).

Figures 21, 22:
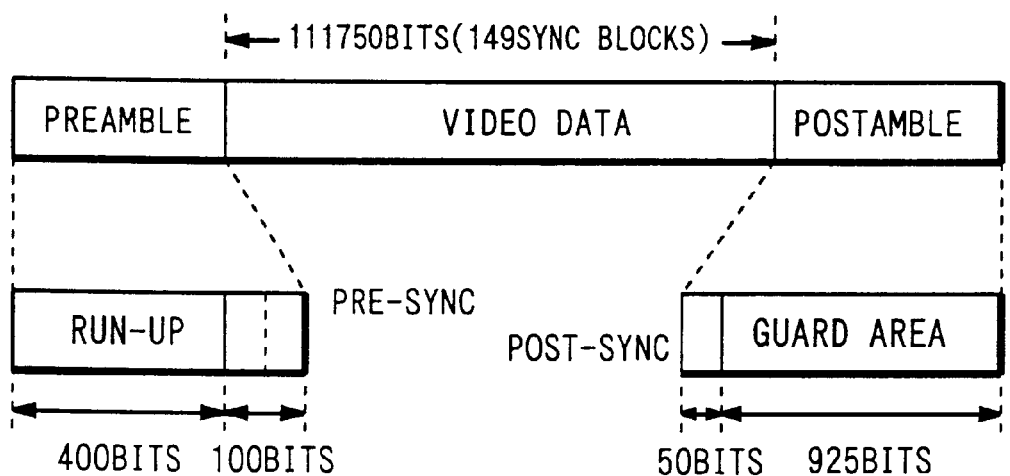
FIG. 21 is a schematic diagram of the arrangement of audio packs in FIG. 20 on a tape.
FIG. 22 is a schematic diagram of a video area recorded on the tape.

The compressed blocks should be arranged in a frame suitable for VCR recording. Thus, a frame segmenting circuit 58 receives the video compressed blocks and arranges them into a frame. For example, the frame may correspond to the arrangement shown in FIG. 23. In FIG. 21, the packs 50 to 55 are staggered in each track of a tape medium and repeated for 10 tracks to reduce the risk of losing data due to recording head/tape failure by recording the blocks in a number of different places. The multiplexor 61 (FIG. 5) arranges the video and audio sync blocks into the packs 50–55. A more detailed explanation of the track arrangement will be described below with reference to the tape format.

Figure 14A:
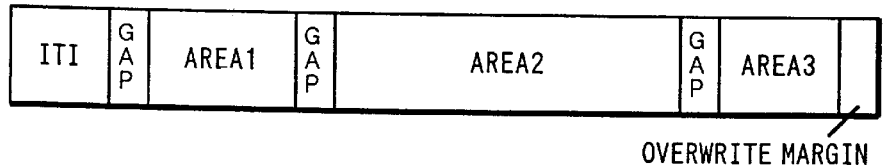
FIGS. 14A and 14B are schematic diagrams of a specific example of data storage in each track of the tape.
Figure 14B:
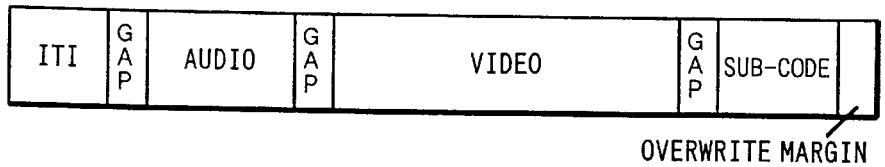
Figure 23:
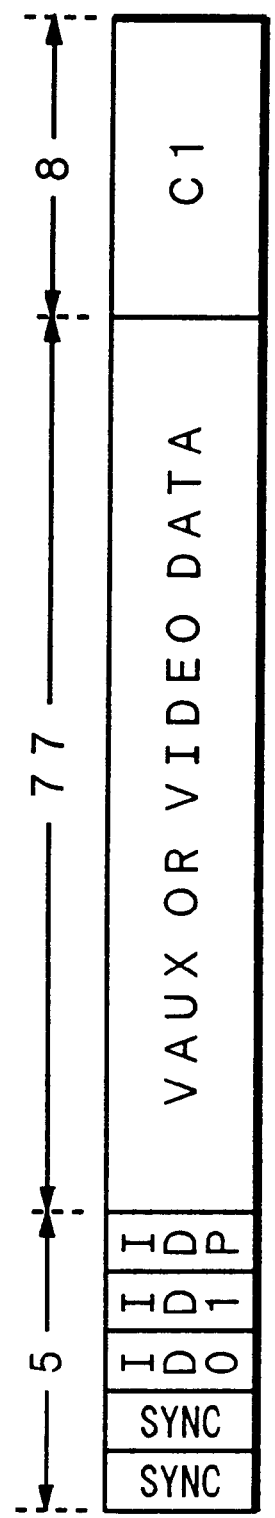
FIG. 23 is a schematic diagram of a video sync block which may contain auxiliary video data.

VAUX information used to reconstruct the video portion of the PAL plus signal is generated by a VAUX generating circuit 60 and combined with the framed video data by a VAUX adding circuit 59. The WSS and reference burst data are VAUX information and are stored in a special pack of data called a TR pack within the VAUX data. The time at which the VAUX data is sent to the VAUX adding circuit is controlled by a controller 80, such that the VAUX data is added at a position within the frame (FIG. 23) reserved for VAUX data. FIG. 14B depicts a track format employed in the preferred embodiment with the video data sandwiched between the audio and sub-code data. FIG. 22 details the video section of the track, wherein FIG. 23 shows the VAUX data stored within the data section of a sync block. The combined VAUX and video data is, then, sent to a multiplexer 61 which multiplexes the video data and other data at the appropriate time corresponding to a position on the record medium. Thus, the multiplexer times the recording of the video data onto the record medium.

The audio signal is received by terminal 62 for processing by the digital VCR. An analog-to-digital converter 63 of the preferred embodiment digitizes the audio signal but need not compress the signal because audio data is less complex than video data. The digitized audio data is sent to an audio processing circuit 64 which packs the audio data according to a predetermined sync block. An example of the audio sync block format is shown FIGS. 18 and 19A–B and will be discussed in more detail with reference to the tape format.

Auxiliary audio data AAUX is generated by an AAUX generating circuit 66 from information forwarded by the controller 80 from input terminal 51 and added to the audio data by an AAUX adding circuit 65. As in the case of the video data, the combined AAUX and audio data is sent to the recording head as determined by the multiplexer, such that the combined data is inserted into the area of the record medium reserved for audio data.

The multiplexer also multiplexes sub-code data onto the record medium when the recording head is positioned over the area reserved for the subcode data. In one embodiment, the sub-code data includes summary information on the contents of the video and audio data stored in an adjacent area of the record medium. A high speed search operation accesses the recorded sub-code data, allowing the digital VCR to quickly scan the sub-code data without the necessity of accessing the audio or video data directly.

The multiplexer, thus, selects the video, audio or sub-code data for recording at the time when the record medium is at a position corresponding to the audio, video or sub-code positions. Before being recorded at those positions, however, the multiplexed data is forwarded to an error correction encoding circuit 68 for error correction in preparation for recording. The error correction encoding adds an error correction code to the record data. This error correction code is used on the reproducing side of the digital VCR to determine whether the information is valid by checking whether the reproduced area correction code is correct.

A channel encoding circuit 69 receives the error correction encoded signal and in one embodiment performs a "24 to 25" conversion such that the data to be recorded agrees with digital VCR recording standards The channel encoding circuit also encodes the error correction encoded signal into a digital VCR format corresponding to the partial response class 4 format.

Now, the data is ready for recording onto the record medium by the recording head 70. The recording head digitally records the channel encoded signal to the record medium and the recording processing is complete. The actual signals recorded on the record medium fall within the ranges shown by FIGS. 6A to 6E.

Figure 6A:
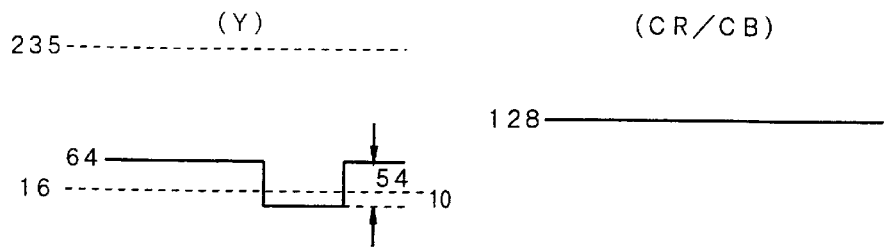
FIGS. 6A to 6E are schematic diagrams showing levels of signals recorded on a recording tape.

FIG. 6A shows the WSS and reference burst signal on line 23 of the PAL plus signal is recorded onto the record medium with the range of values. The DC offset of the WSS signal is shown as the first part of the signal line with a value of "64". The following reference burst signal is shown as that part of the signal with a DC offset of "10". It will be noted that the reference burst signal has a lower DC offset than the DC set up value "16".

It will be appreciated that the DC offset for the helper signal (transmitted as a color difference signal $C_B$, $C_R$ in FIG. 6A) is "128". As described, the difference in the DC offset value between the helper signal "128" and the luminance signal "64" results in DCT distortion. With the present invention, however, the difference in DC offset is corrected such that no DCT distortion occurs.

Figure 6B:
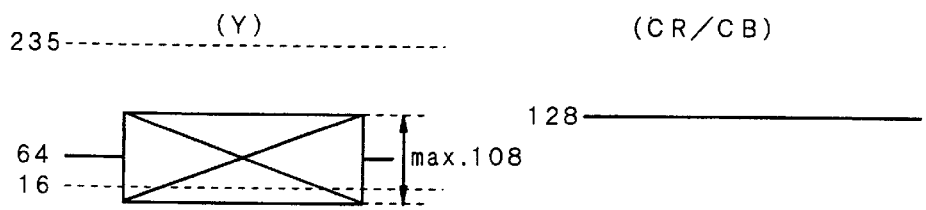

The DC offset values for the signals occurring during the invalid screen portions will next be discussed with reference to FIG. 6B. In this situation, the helper killer function is turned off such that the signals transmitted during the invalid screen portions are sent to the digital VCR. The helper signal has a DC offset of "64" with a fluctuating range of "108". It will be appreciated that the maximum variation of the helper signal is normalized to "108" by the analog-to-converter 9b (FIG. 2). From FIG. 6B, it will be seen that the helper signal is DC shifted to the value "64" to be commensurate with the luminance signal DC offset. Notably, there is no signal inserted in either of the color difference signal lines in FIGS. 6A and 6B as depicted by the flat lines labelled "128" in the figures.

Figure 6C:
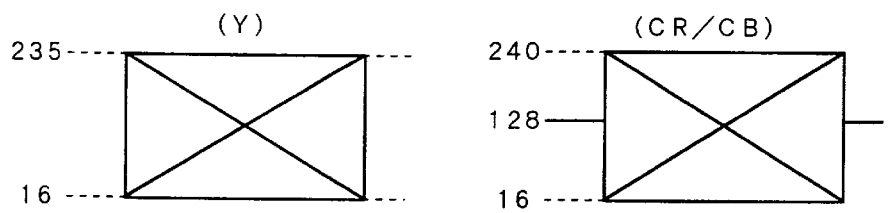

The main screen portions for the luminance signal (Y) and color difference signal ($C_B$ and $C_R$) are shown in FIG. 6C. It will be noted that the maximum level for the luminance signal (Y) corresponds to the white 100% reference level "235" and the minimum value thereof corresponds to the pedestal level "16". The white 100% reference level defines the level at which the corresponding image is white, whereas the pedestal level corresponds to a color just above the black level. The color difference signals define chrominance, not brightness, and may have a maximum value "240" greater than the white 100% reference level of the luminance signal (Y) "235". However, both luminance and color difference signals both share the minimum pedestal level of "16" since darkness is an attribute of both luminance and chrominance.

Figure 6D:
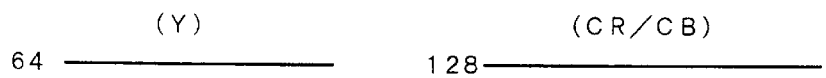

FIG. 6D shows the luminance and color difference signals latched at "64" and "128", respectively. As described with reference to FIG. 4, the signal lines are switched to these mute levels for the first three upper lines of the main screen portions in each field (i.e., first six lines of FIG. 1, lines 60 to 62 and lines 372 to 374). Muting the levels of the signal lines also prevents DCT distortion by ensuring that the first six lines of the main screen portion (block A, FIG. 1) have a consistent range of values with the helper signal.

Figure 6E:
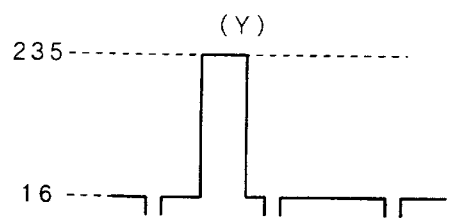

FIG. 6E depicts the reference signal on line 623 of the PAL plus transmission. It will be appreciated that line 623 is in an invalid screen portion and, therefore, is ignored by the VCR unless specially recorded. The figure shows that the white 100% reference level extends from the pedestal level "16" to the maximum luminance level of "235". This defines the value of the luminance signal at which the corresponding image becomes saturated with brightness and turns white.

Reproducing Apparatus

Figure 9:
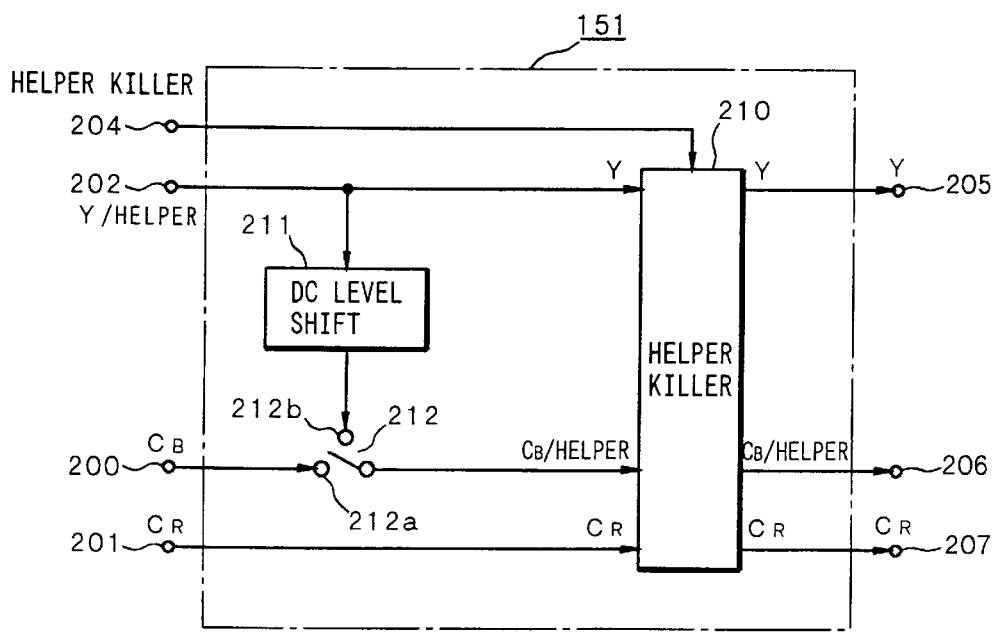
FIG. 9 is a block diagram of the PAL plus reproduction side processing circuit of FIG. 8.
Figure 7:
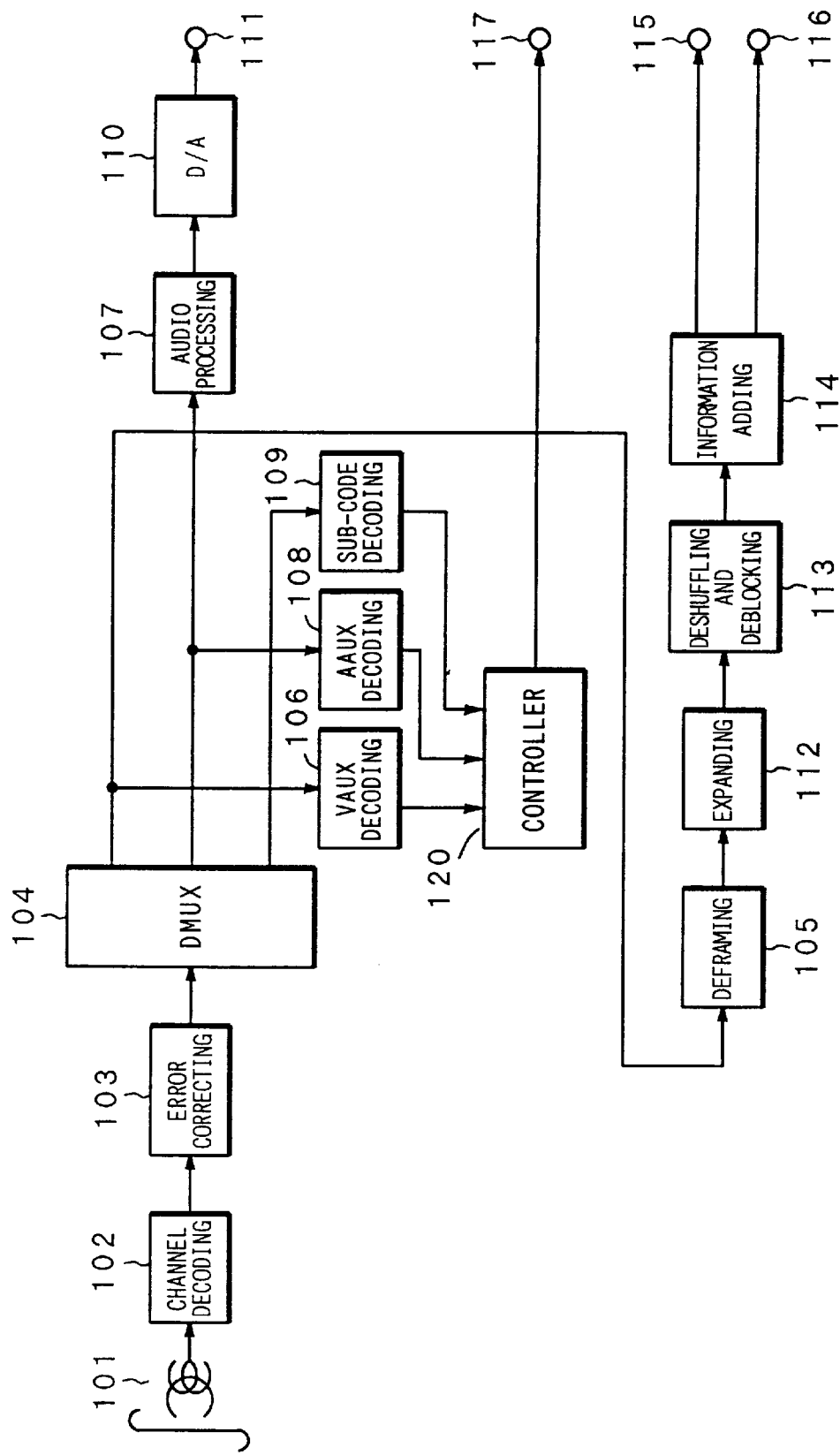
FIG. 7 is a block diagram showing a reproduction side of a digital VCR.

Now, reproduction of the PAL plus signal which has been processed and recorded as aforementioned, will be described with reference to FIGS. 7–9. In the preferred embodiment, the reproducing side of the digital VCR is shown in FIG. 7 and is symmetrical, i.e., performs the inverse of the operations of the recording side of the digital VCR.

A reproducing head 101 reads the signals from the record medium and transfers them to a channel decoding circuit 102. The channel decoding circuit performs the inverse function to the channel encoding circuit 69 (FIG. 5) and, therefore, in this embodiment performs a "25 to 24" conversion and decodes the recorded signal in the partial response class 4 format.

An error correcting circuit 103 checks whether the error code inserted into the recorded signal by the error correction encoding circuit 68 (FIG. 5) is correct. If the error code is not correct, the error correcting circuit performs error correction, such as parity byte correction or commands the reproducing head 101 to re-read the record medium.

A demultiplexer 104 demultiplexes the reproduced signal corresponding to the type of reproduced data. Thus, video data is demultiplexed and supplied to the corresponding video circuitry, i.e., VAUX decoding circuit 106 and deframing circuit 105. Similarly, the audio data is demultiplexed and supplied to AAUX decoding circuit 108 and audio processing circuit 107. The sub-code data is demultiplexed and supplied to sub-code decoding circuit 109.

The VAUX decoding circuit extracts the auxiliary video data from the video signal forwarded from the demultiplexer. As will be noted, the VAUX data includes the TR pack (FIG. 17), a special pack which stores the WSS and reference burst signals. This data is forwarded to a controller 120, which sends the VAUX data to the WSS/reference encoding circuit 152 of FIG. 8. The controller is, thus, operable to time the output of the VAUX data when the PAL encoder 155 (FIG. 8) is encoding line 23.

The video data supplied to the deframing circuit 105 is recorded on the tape medium in the fixed arrangement shown in FIG. 14B. Thus, the deframing circuit is operable to deframe the video portions from the other portions of the frame and forward them to an expanding circuit 112.

The expanding circuit performs a function inverse to that of the compressing circuit 57 (FIG. 5) and, thus, performs an inverse DCT transform. The expanding circuit generates decompressed DCT blocks (e.g., block A, FIG. 1) that are sent to a deshuffling and deblocking circuit 113 which reorders the blocks into a coherent image in the line and sampling order shown in FIG. 1.

Inverse to the valid information extracting circuit 55 (FIG. 5), an information adding circuit 114 adds horizontal and vertical sync pulses to the PAL plus signal generated by the deshuffling and deblocking circuit. The resultant luminance (Y) and chrominance (C) signals are sent to the reproducing apparatus via output terminals 115 and 116.

The audio data is output from demultiplexer 104 to the AAUX decoding circuit 108 and the auxiliary audio data is extracted therefrom and forwarded to the controller. As with the video data, the auxiliary audio data is forwarded to the reproducing apparatus (not shown).

The sub-code data is demultiplexed to the sub-code decoding circuit 109. The sub-code is extracted and forwarded to the controller for output to the reproducing apparatus (not shown) at a time when the subcode data is aligned with the reproducing head.

In this manner, the digitally recorded signal is reproduced by the reproducing side of the digital VCR of FIG. 7 and forwarded to the reproducing apparatus of FIG. 8 which will be described in more detail below.

Figure 8:
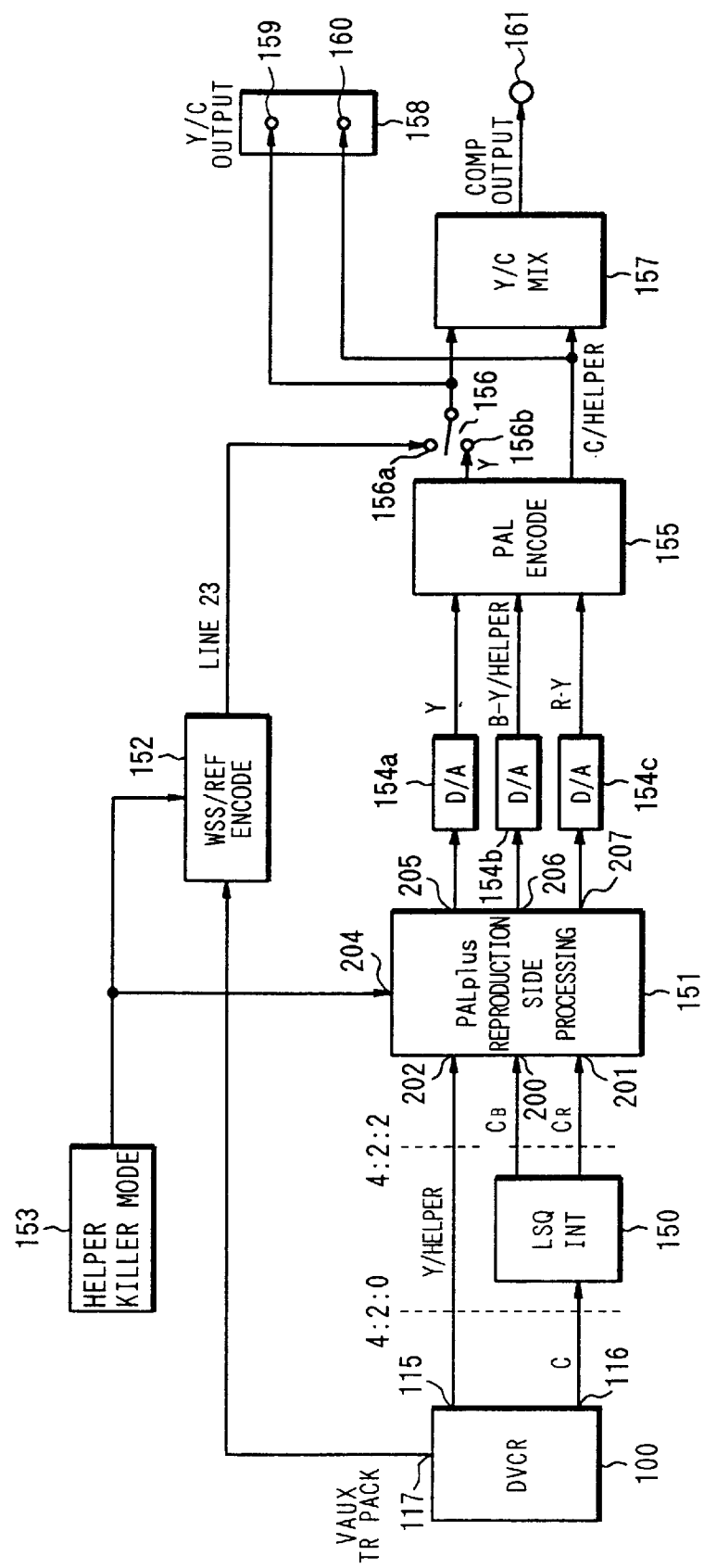
FIG. 8 is a block diagram showing the reproducing apparatus for reproducing a PAL plus signal according to the present invention.

As aforementioned, the controller (FIG. 7) sends the TR pack of the auxiliary video data to the WSS/reference encoding circuit 152 of FIG. 8 at a time when the PAL encoder 155 is encoding line 23. A counter (not shown) may be provided to count the line number that the PAL encoder is currently processing. A switch 156 is provided to switch to terminal 156a at the time when line 23 is being processed such that the WSS and reference burst data extracted by the encoder 152 from the TR pack is output to a Y/C mixer 157. At times when the PAL encoder 155 is processing the helper signal or main portions of the PAL plus signal, the switch 156 is set to the terminal 156b and the output of the PAL encoder is forwarded to the Y/C mixer 157.

The luminance signal (Y) and the helper signal which had been recorded with the luminance signal (Y) are forwarded directly to an input terminal 202 of a PAL plus reproduction side processing circuit 151.

On the other hand, the chrominance signal (C) is forwarded from the digital VCR to a line sequence interpolating circuit 150 before being sent to the PAL plus reproduction side processing circuit. The line sequence interpolating circuit converts the chrominance signal (C) into color difference signals ($C_B$ and $C_R$). The converted color difference signals are, then, forwarded to the PAL plus reproduction side processing circuit for further processing. It will be appreciated that the luminance signal (Y) and the color difference signals ($C_B$ and $C_R$) are input to the PAL plus reproduction side processing circuit in a 4:2:2 byte format, consistent with the PAL plus standard.

As in the case of the recording apparatus, the reproducing apparatus also provides a helper killer mode circuit 153 for "killing", or muting, the helper signal at times when the digital VCR is not able to process the helper signal or the helper signal has a greater bandwidth than the VCR can process. In such instances, the helper killer signal is sent to both the WSS/reference encoding circuit and the PAL plus reproduction side processing circuit indicating that both the WSS/reference burst signal and the helper signal are to be "killed". As in the case of recording, the luminance signal (Y) is muted to a DC level "64" and the color difference signals ($C_B$ and $C_R$) are muted to the DC level "128" in response to the helper killer signal.

The operation of the PAL plus reproduction side processing circuit 151 will now be described in more detail and with particular reference to FIG. 9. The luminance signal (Y) and the helper signal are received by input terminal 202 and forwarded to both a helper killer circuit 210 and a DC level shift circuit 211. The DC level shift circuit removes the DC set up value added by the recording apparatus which provides the helper signal with a DC level commensurate with the color difference signals.

During transmission of the helper signal, a switch 212 is set to terminal 212b and the DC-restored helper signal is fed onto the blue color difference signal line. At other times, for example, when the main screen portions are processed, switch 212 is set to terminal 212a and the blue color difference signal is fed directly to the helper killer circuit 210. In this manner, the DC set up value added to the helper signal is removed and the helper signal is substituted for the color difference signal ($C_B$) at this time. The luminance signal (Y) and the red color difference signal ($C_R$) are forwarded directly to the helper killer circuit.

When the helper killer circuit is turned on, the reproducing side processing circuit 151 "kills" the helper signal by muting the luminance signal (Y) line. The line number can be determined by employing a line counter (not shown) which triggers the helper killer circuit to "kill" the helper signal on lines 24 to 59, 275 to 310, 336 to 371, and 587 to 622. The color difference signal lines ($C_B$ and $C_R$) are muted to the gray level "128" at this time since no signals are to be transmitted on those lines at this time. On the other hand, when the helper killer circuit is turned off none of the signals are muted and such signals are passed directly through the helper killer circuit.

In this manner, the PAL plus reproduction side processing circuit removes the DC level shift from the helper signal and replaces the helper signal onto the blue color difference signal line ($C_B$). The luminance signal (Y) and the color difference signals ($C_B$ and $C_R$) are output from the PAL plus reproduction side processing circuit to digital-to-analog converting circuits 154a, 154b and 154c, respectively, as shown in FIG. 8. The digital-to-analog circuits convert the video component signals from their digital versions to analog versions which are sent to the PAL encoder 155 for encoding.

The PAL encoder line sequences the color difference signals into a chrominance signal (C). It will be appreciated that the PAL encoder also inserts the reference burst signal onto the chrominance signal line (C) when the line counter reaches line 23.

After encoding, the luminance signal (Y) is output from the PAL encoder and sent to a switch 156. During the reproduction of the main screen portions, switch 156 is set to terminal 156b and the encoded luminance signal is sent to a Y/C mixer 157 along with the chrominance signal and the helper signal which are forwarded directly to the Y/C mixer. The Y/C mixer recombines the component video signals (Y) and (C) into a PAL plus transmission signal supplied to output terminal 161. The component video signals (Y) and (C) may also be output to a dual terminal 158 for systems which require that the component signals be produced separately.

In this manner, the digitally recorded signal is reproduced and processed for transmission into a PAL plus signal.

Tape Format

In the above-described embodiment, reference has been made to the tape format employed by the digital VCR. A more detailed explanation of that tape format will now be described with reference to FIGS. 10A to 26. While the above embodiment describes recording/reproducing PAL plus signals to and from a tape medium, any type of record media may, of course, be employed.

Figures 10A, 10B:
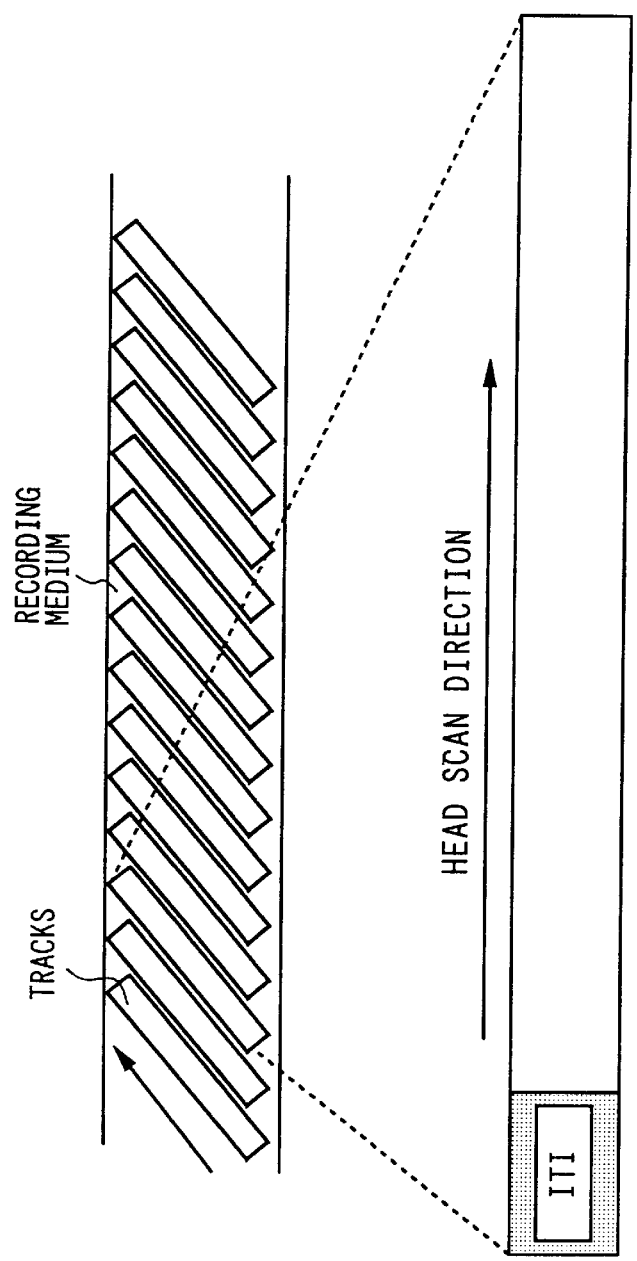
FIGS. 10A and 10B are schematic diagrams showing a track format of the tape.

The digital VCR records tracks onto the recording medium using a helical recording technique, wherein a rotary magnetic head spins at an angle to the video tape which travels along a head scan direction. The resulting track pattern shown in FIG. 10A has tracks arranged at a slant along the tape medium. Companion figure, FIG. 10B, shows that each track is headed by an Insert and Track Information (ITI) header, which includes information for aligning the data within the tracks. For example, the ITI header indicates where the audio area, video area and subcode areas begin.

Figure 11:
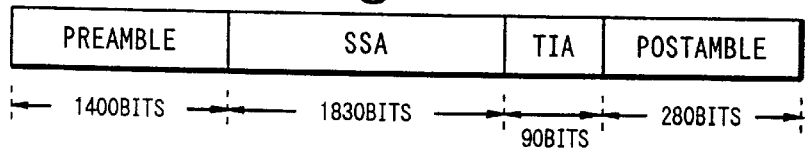
FIG. 11 is a schematic diagram showing the arrangement of each track of the tape.

The ITI area includes different information, as shown in FIG. 11. The ITI area begins with a preamble which is comprised of 1400 bits and is used as run-in when the magnetic head reproduces a digital signal. The preamble is followed by a Start Sync Block Area (SSA) comprised of 1830 bits to designate the start of a sync block area. The ITI then includes 90 bits of Track Information Area which stores information about all of the tracks. Included in the TIA is an Application ID of a Track (APT) of three bytes, a SP/LP flag, a reserve byte and a Pilot Frame (PF) which represents a reference frame for the servo system. The TIA is followed by the postamble composed of 280 bits, used to provide a margin for the track.

Figure 12:
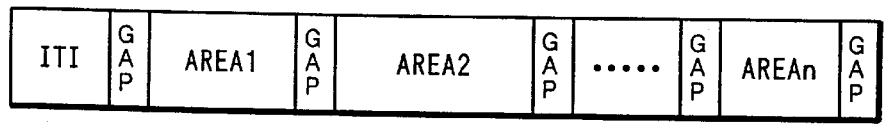
FIG. 12 is a schematic diagram showing the arrangement of data in each track of the tape.

The remainder of the track is allocated among areas (AREA 1, AREA 2 . . . AREA n) separated by gaps (FIG. 12). As shown in FIG. 14B, the areas may be audio, video or sub-code areas. The ITI indicates where these areas begin/end and the digital VCR employs the ITI to quickly find and retrieve the desired area.

Figure 13:
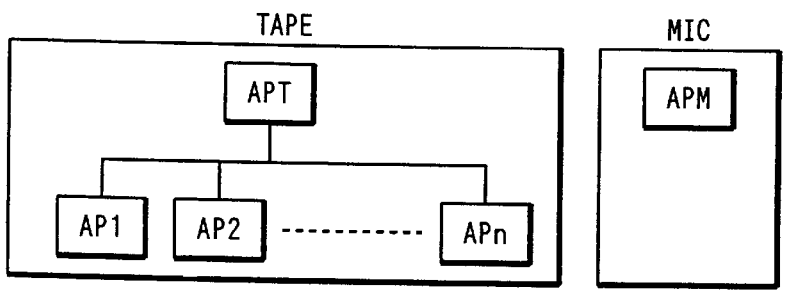
FIG. 13 is a schematic diagram showing an hierarchical structure of application ID blocks.

The application ID (APT) stored in the TIA designates the different areas as being video, audio or sub-code areas. As shown in FIG. 13, the application ID (APT) can be an hierarchy of application IDs. With such an hierarchical structure, whole branches including several areas of the tree can be extracted by the digital VCR. In this manner, areas corresponding to a video picture can be linked to each other for ease of reproducing the video picture.

The cassette housing of the video tape preferably includes a memory IC (MIC). The MIC of the cassette is in communication with the digital VCR and can be employed to remember aspects relating to all of the recorded programs on the video tape. For example, the MIC can mark a predetermined program, designate the reproduction order of programs, designate a predetermined scene for reproducing a still image (i.e., a photo), and reserve a timer record operation.

The MIC also has an application ID (APM) as shown in FIG. 13 which is located in the high order 3 bytes of the MIC. Similar to the Application ID of the tracks, the APM determines the data structure of the MIC.

As an example of the application ID designating different areas of the track, reference will be made to FIGS. 14A and 14B. When the application ID for each of the areas AP1, AP2 and AP3 are set=000, the areas shown in FIG. 14A are designated as audio, video and sub-code areas, respectively, as shown in FIG. 14B. Of course, any digital representation for an application ID can be used to indicate the data structure.

Figures 15, 16, 17:
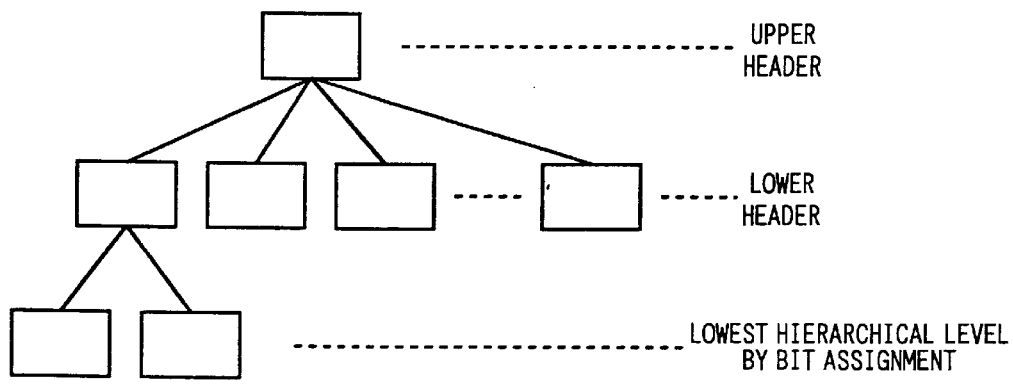
FIG. 15 is a schematic diagram showing the structure of a pack of data.
FIG. 16 is a schematic diagram showing a data structure of a header arranged in the pack of FIG. 15.
FIG. 17 is a schematic diagram showing a TR pack.
Figure 20:
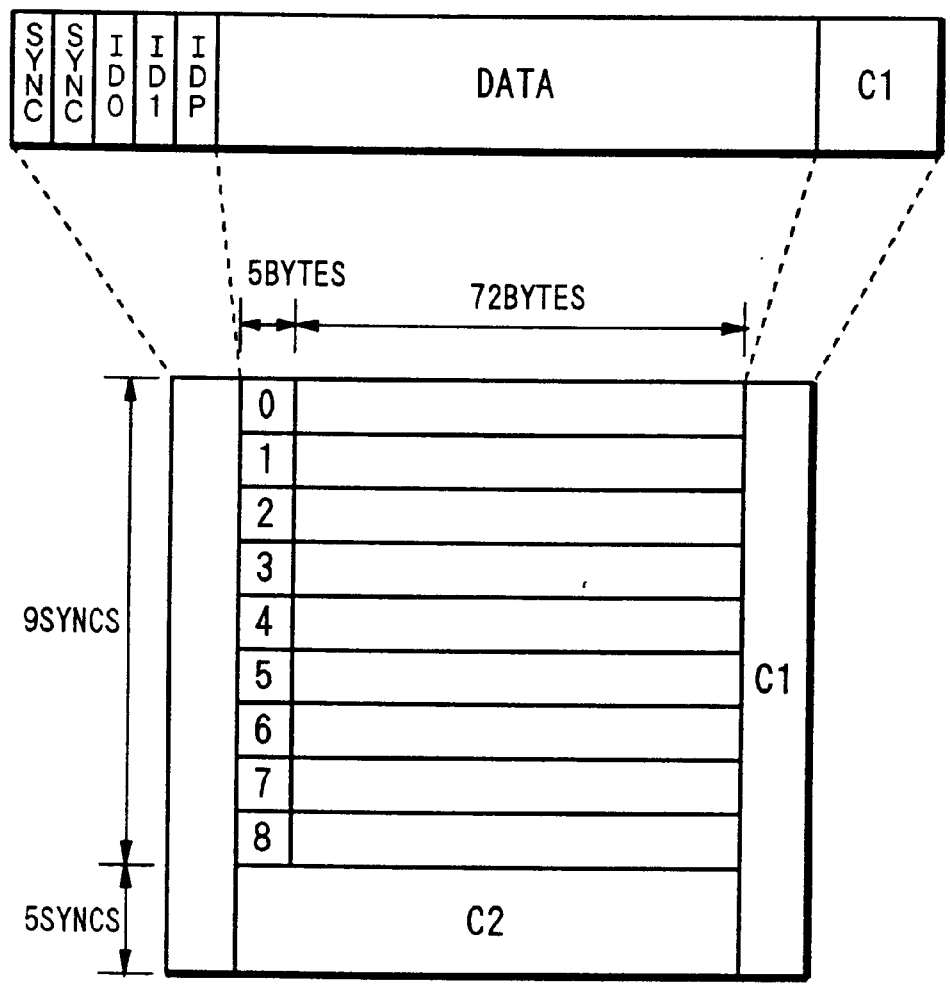
FIG. 20 is a schematic diagram showing the audio sync blocks of the FIG. 18 arrangement on the tape.

The digital VCR records the different data structures onto the recording medium in a specific format. The AAUX, VAUX, sub-code and MIC data relate to information about the video picture and are written in a pack structure shown in FIG. 15. As shown, a pack of AAUX data is composed of 5 bytes (PC0 . . . PC4) with the high order byte reserved as a header (PC0) and the 4 lower bytes reserved for data. The high order 4 bits of the header (PC0) can be used as an upper header and the lower order 4 bits of the header can be used as a lower header in an hierarchical structure as shown in FIG. 16. Further levels can be created by using the bits in the data area (PC1 . . . PC4). As shown in FIG. 20, packs are arranged within a track in a grid with, for example, each of packs (0 . . . 8) corresponding to an AAUX pack. Each pack is fixed in length to 5 bytes. However, when data is written to the MIC, the pack structure has a variable length such that the MIC can be filled to capacity to obtain the most efficient use of the MIC.

When PC0 is set to 66h (hexadecimal) as shown in FIG. 17, the data pack is regarded as a TR pack. The TR pack, as described above, includes video picture information, such as the WSS signal and the white 100% reference signal. The data type section of PC1 is used to indicate which type of data follows. This data type in the TR pack can include information on the VBID, EDTV-2 ID on line 22 and EDTV-2 ID on line 285. Further, the TR pack may contain any combination of the data types including WSS data in PC2 and white 100% reference data in PC4. Since the white 100% reference signal is transmitted during line 623 and is not recorded by the digital VCR, it is preferred that the white 100% reference data be stored in the TR pack as well.

Figure 18:
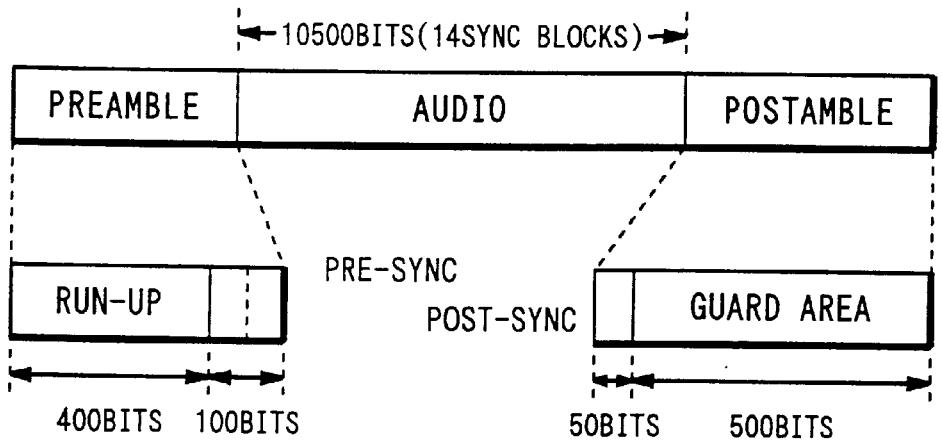
FIG. 18 is a schematic diagram showing an audio format for a track of the tape.

The audio data is stored as a sector on the recording medium in the arrangement shown in FIG. 18. The digital VCR frames a preamble, an audio area and a postamble into the audio sector along each track in the audio area (FIG. 14B) of the track. The preamble includes a run-up of 400 bits followed by 100 bits of actual preamble information, including 6 bytes of a pre-sync block. The audio area is composed of the 14 sync blocks (10,500 bits) of FIG. 20. That is, each audio area contains the grid arrangement of packs shown in FIG. 20. The postamble (FIG. 18) includes 50 bits of a post-sync block and 500 bits of a guard area; the guard area being provided to prevent the audio data from overlapping into the next video sector.

Figure 19A:
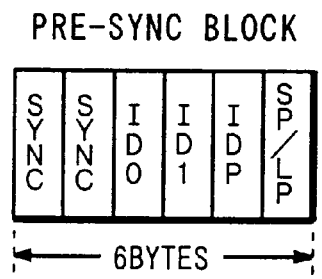
FIGS. 19A and 19B are schematic diagrams of the pre-sync and post-sync blocks of FIG. 18.
Figure 19B:
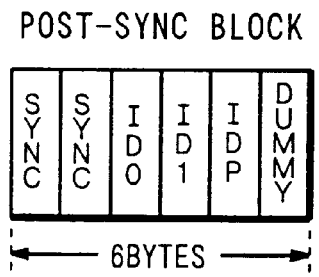

The pre-sync block and the post-sync block are shown in detail in FIGS. 19A and 19B. The pre-sync block is shown as having 6 bytes, including an SP/LP byte, which indicates whether a standard play SP or a long play LP mode is selected and which is omitted from the post-sync block of FIG. 19B. The remainder of the pre-sync and post-sync blocks contain two sync bytes, followed by three identification bytes (ID0, ID1 and IDP).

The audio sync blocks are collected and recorded on the recording medium with the audio area (FIG. 18) in groups of 14 sync blocks per track as shown in FIG. 20. The first nine audio sync blocks of each group, that is, the first nine audio sync blocks in the audio sector of a track, contain audio information, whereas the last five sync blocks are reserved for parity information. The first five bytes of each data sector in an audio sync block is reserved for the 5 bytes of the AAUX pack (FIG. 15). Recalling that the digital VCR 104 performs a "24 to 25" conversion prior to the recording of the signal, the total bit length of the group of 14 sync blocks per track is calculated as follows:

$$90 \times 14 \times 8 \times 25 \div 24 = 10,500 \text{ bytes}$$

The audio area preferably includes the parity sectors C1 and C2. The parity sector C1 is known as a horizontal parity because C1 assists the digital VCR in detecting areas in the data of the respective audio sync blocks. The parity sector C2, on the other hand, is known as a vertical parity because C2 assists the digital VCR to determine what will be seen as vertical errors in all the sync blocks.

The digital VCR records the data packs, comprising the 14 audio sync blocks, onto the recording medium in the manner shown in FIG. 21. Each of the pack numbers (0 . . . 8) in FIG. 21 represent the packs (0 . . . 8) in FIG. 20 which make up the data portion of the sync block. Packs 50 to 55 are each comprised of audio data packs and packs (a . . . g) are comprised of optional audio data. The packs are arranged in the grid shown and repeated throughout tracks 1 to 10 in order to ensure that the information in each data pack is recovered upon a reproducing operation even if a portion of the data is lost due to a mechanical failure. With this arrangement, recovery of the audio data is ensured even if a portion of the recording medium is corrupted.

The video data are stored in sync blocks in a similar fashion to the audio data as shown in FIG. 23. As in the audio case, the video sector (FIG. 22) includes a preamble, a video area and a postamble. Since video data is more comprehensive than audio data, however, more video sync blocks as well as bytes per video sync block are used in the video sector than in the audio sector, as indicated by the bit designations in FIG. 22. Specifically, the video sector is formed of 111,750 bits (versus 10,500 bits of the audio sector) and the guard area is formed of 925 bits (versus 500 bits of the audio guard area). The guard area of the video data is larger than in the audio data because video data tends to be larger than audio data and more guard bits are required to ensure that the video data does not overlap into adjoining areas of the record medium. The video sync block may also include the parity sector C1 shown in FIG. 23.

Figure 24:
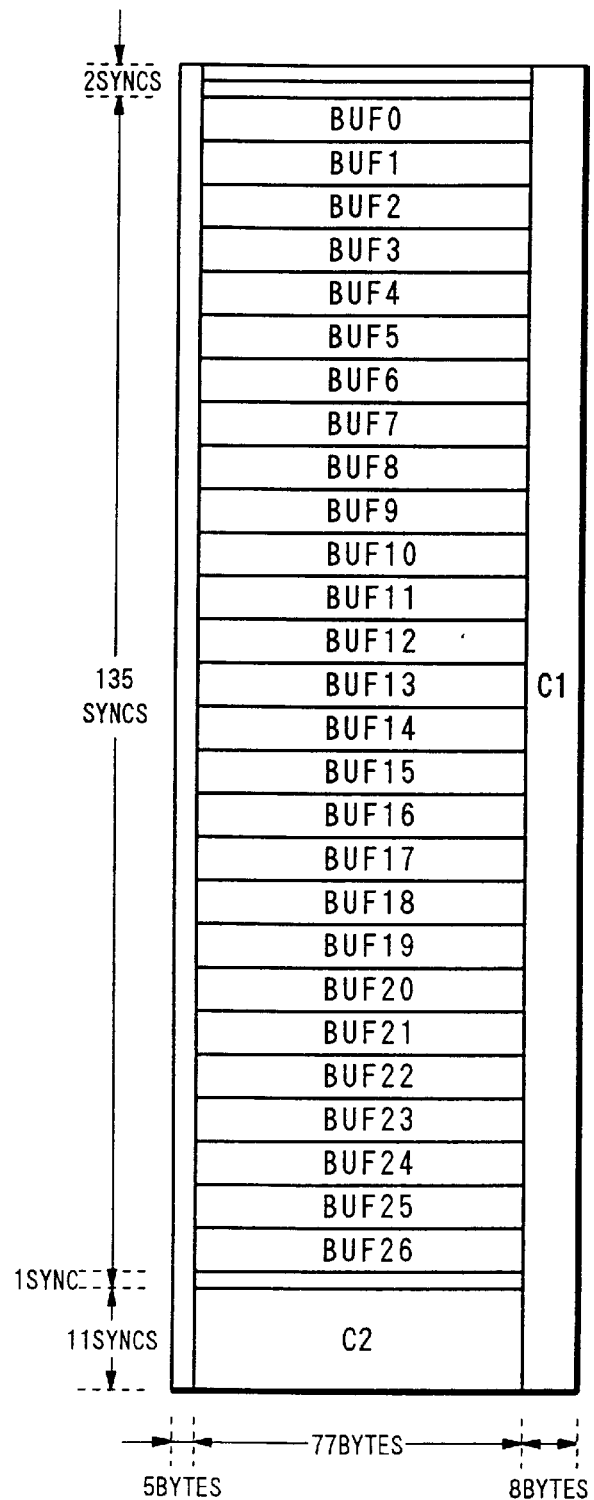
FIG. 24 is a schematic diagram showing video sync blocks of FIG. 23 stacked into buffers.

The buffers in FIG. 24 are stored on a track of the record medium within the video area of the video sector. Since each buffer (BUFF 0 to BUFF 26) contains five video sync blocks the total of 27 buffers yields 135 video sync blocks in each track. As in the audio area, horizontal parity C1 and vertical parity C2 are provided to ensure that the digital VCR will accurately reproduce the stored video data. The first two sync blocks, the first five bytes of each buffer, and the sync block after the last buffer (BUFF 26) may be left blank to provide margins so that the reproducing head of the digital VCR 104 can be accurately aligned with the appropriate video sync blocks.

As with the audio data, the video data is converted by a "24 to 25" conversion process by the digital VCR before being recorded on the recording medium. After the conversion, the total bit length of the video sector is as follows:

$$90 \times 149 \times 8 \times 25/24 = 111,750 \text{ bits}$$

Figure 25:
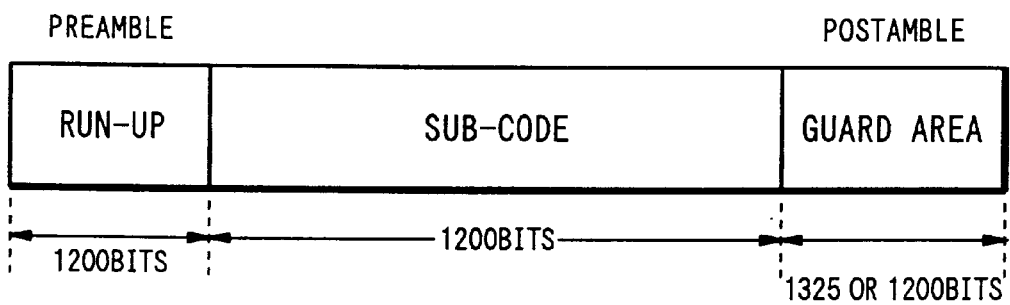
FIG. 25 is a schematic diagram of a sub-code area recorded on the tape.
Figure 26:
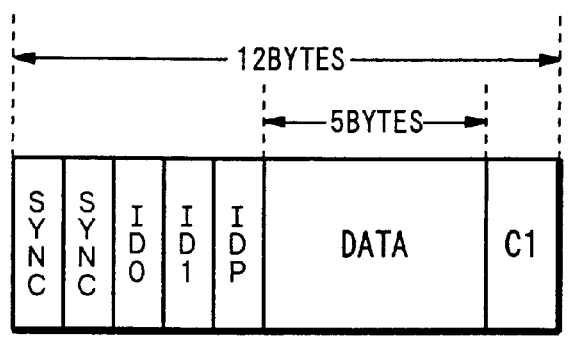
FIG. 26 is a schematic diagram of a sub-code sync block.
Figure 27B:
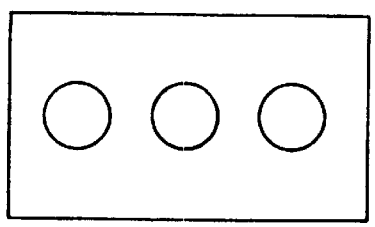
FIGS. 27A and 27B are schematic diagrams of a conventional receiver and a PAL plus receiver.
Figure 27A:
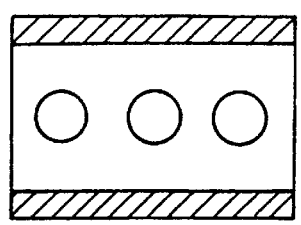

Subcode data is also recorded on the recording medium in a data pack arrangement. As shown in FIG. 25, the subcode sector includes 1200 bits of a preamble, 1200 bits of a subcode area and 1325 or 1200 bits of a postamble. Unlike the audio and video areas, the preamble of the subcode sector does not have a pre-sync block and the postamble of the subcode area does not have a post-sync block. This is because the subcode sector is frequently rewritten for indexing during a search, and updating the pre-sync and post-sync blocks each time during the search is time consuming. The subcode sector preferably contains 12 subcode sync blocks with each subcode sync block including 5 pre-sync bytes, 5 data bytes and parity bytes C1 as shown in FIG. 26, thus forming a 12-byte sync block.

The sub-code data is also converted by a "24 to 25" conversion process of the digital VCR and the total bit length of the sub-code sector is as follows:

$$12 \times 12 \times 8 \times 25/24 = /1200 \text{ bits}$$

Thus, the present invention provides a recording/reproducing apparatus and method for digitally recording a PAL plus signal to a record medium and reproducing the signal therefrom without DCT distortion. It is to be understood that, within the scope of the appended claims, the invention may be practiced otherwise than as specifically described herein.

We claim:

1. An apparatus for reproducing from a record medium a digital signal representing a video image and including a vertical resolution signal and a component video signal, the digital signal being in the form of compression blocks with at least some compression blocks including both said vertical resolution signal and said component video signal, wherein said vertical resolution signal included in said compression blocks are DC shifted from varying DC offsets to a DC setup value thereby preventing compression distortion resulting from compression of signals of varying DC offsets within said compression blocks, said apparatus comprising:

means for reproducing said compression blocks from said record medium; and means for DC shifting said vertical resolution signal of said compression blocks, shifted to said DC set up value so as to prevent said compression distortion, to said varying DC offsets such that said DC set up value is removed.

2. The apparatus of claim 1, wherein said means for DC shifting removes said DC set up value from said vertical resolution signal.

3. The apparatus of claim 1, further comprising means for normalizing said component video signal.

4. The apparatus of claim 1, wherein said means for DC shifting comprise a DC level shifter for shifting said vertical resolution signal by a predetermined amount.

5. The apparatus of claim 1, wherein said means for DC shifting further comprises vertical resolution killing means for selectively killing said vertical resolution signal by setting said vertical resolution signal to a mute level.

6. The apparatus of claim 1, wherein said digital signal is a PAL plus signal including a luminance signal and color difference signals, said vertical resolution signal being stored on said record medium with said luminance signal, and said apparatus further comprising means for extracting said vertical resolution signal from said luminance signal and adding said vertical resolution signal to said color difference signals, said luminance signal having a different DC offset than said color difference signals.

7. The apparatus of claim 6, wherein said compression blocks include both said luminance signal and said vertical resolution signal.

8. The apparatus of claim 6, further comprising a digital VCR for digitally reproducing said PAL plus signal from said record medium.

9. The apparatus of claim 8, wherein said digital VCR includes inverse discrete cosine transform decompressor means for decompressing said compression blocks.

10. A method for reproducing from a record medium a digital signal representing a video image and including a vertical resolution signal and a component video signal, the digital signal being in the form of compression blocks with at least some compression blocks including both said vertical resolution signal and said component video signal, wherein said vertical resolution signal included in said compression blocks are DC shifted from varying DC offsets to a DC setup value thereby preventing compression distortion resulting from compression of signals of varying DC offsets within said compression blocks, said method comprising the steps of:

reproducing said compression blocks from said record medium; and

DC shifting said vertical resolution signal of said compression blocks, shifted before compression to said DC set up value so as to prevent said compression distortion, to said varying DC offsets such that said DC set up value is removed.

11. The method of claim 10, wherein said step of DC shifting removes said DC set up value from said vertical resolution signal.

12. The method of claim 10, wherein said step of DC shifting further includes selectively killing said vertical resolution signal by switching said vertical resolution signal to a mute level.

13. The method of claim 10, wherein said digital signal is a PAL plus signal including a luminance signal and color difference signals, said vertical resolution signal being stored on said record medium with said luminance signal; further comprising the step of extracting said vertical resolution signal from said luminance signal and adding said vertical resolution signal to said color difference signals, said luminance signal having a different DC offset than said color difference signals.

14. The method of claim 13, wherein said compression blocks include both said luminance signal and said vertical resolution signal.

15. The method of claim 13, further comprising the step of digitally reproducing said PAL plus signal from said record medium.

16. The method of claim 15, wherein said step of digitally reproducing comprises inverse discrete cosine transforming said some compression blocks.

* * * * *